(12) United States Patent
Park

(10) Patent No.: US 8,375,315 B2
(45) Date of Patent: Feb. 12, 2013

(54) MANAGING A CALENDAR THROUGH A TOUCH INTERFACE AND GRAPHICALLY DISPLAYING THE CHANGE HISTORY

(75) Inventor: Jung-Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 12/772,633

(22) Filed: May 3, 2010

(65) Prior Publication Data

US 2010/0279741 A1 Nov. 4, 2010

(30) Foreign Application Priority Data

May 4, 2009 (KR) .................... 10-2009-0038910

(51) Int. Cl.
*G06F 3/048* (2006.01)
(52) U.S. Cl. .................. 715/764; 715/863; 715/787
(58) Field of Classification Search ............ 715/963
See application file for complete search history.

(56) References Cited

U.S. PATENT DOCUMENTS

| 5,625,377 | A | 4/1997 | Jenson | 345/146 |
| 7,992,096 | B1 * | 8/2011 | Davis | 715/781 |
| 2005/0149858 | A1 | 7/2005 | Stern et al. | 715/513 |
| 2005/0262164 | A1 * | 11/2005 | Guiheneuf et al. | 707/203 |
| 2006/0271399 | A1 | 11/2006 | Robson, Sr. et al. | 705/2 |
| 2007/0168892 | A1 * | 7/2007 | Brush et al. | 715/963 |
| 2007/0256035 | A1 * | 11/2007 | Matsuzawa et al. | 715/864 |
| 2009/0100347 | A1 | 4/2009 | Schemers et al. | 715/751 |

FOREIGN PATENT DOCUMENTS

WO WO 2009/044138 A2 4/2009

OTHER PUBLICATIONS

European Search Report dated Jul. 6, 2011 issued in Application No. 10 16 1799.

* cited by examiner

*Primary Examiner* — Stephen Hong
*Assistant Examiner* — Asher Kells
(74) *Attorney, Agent, or Firm* — KED & Associates, LLP

(57) ABSTRACT

A mobile terminal and method of managing a schedule using the same are disclosed, by which applications can be processed by linking to a schedule. The present invention includes displaying target item information including the schedule by executing a prescribe application, receiving a user's control selection signal for the target item information, and performing a control over the target item information according to the user's control selection signal received via the input device. Accordingly, based on contents of a received message, corresponding information is registered on a schedule table by a simple manipulation. And, schedules in the schedule table can be controlled in a simple manner.

10 Claims, 31 Drawing Sheets

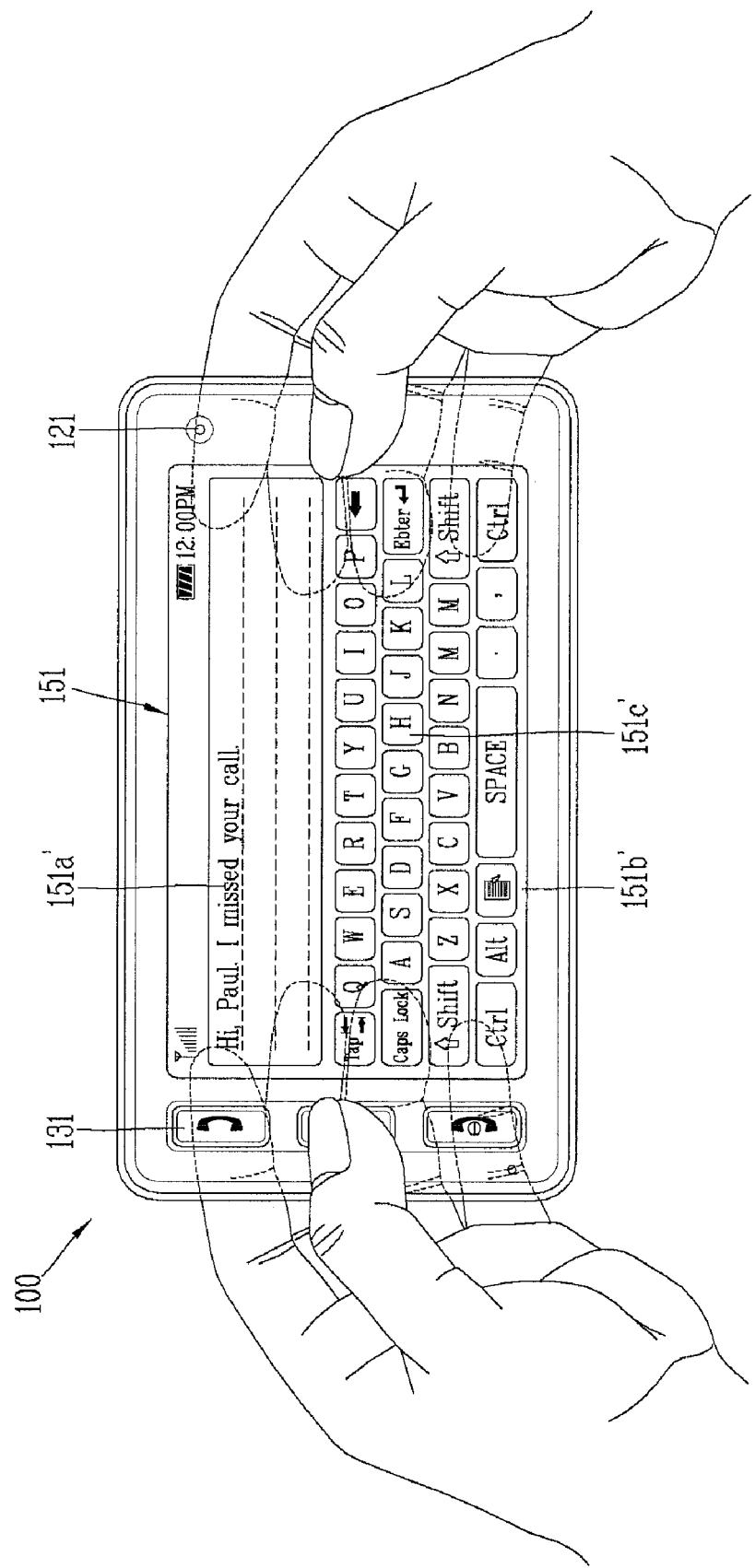

MANAGING A CALENDAR THROUGH A TOUCH INTERFACE AND GRAPHICALLY DISPLAYING THE CHANGE HISTORY

Pursuant to 35 U.S.C. §119(a), this application claims the benefit of earlier filing date and right of priority to Korean Application No. 10-2009-0038910, filed on May 4, 2009, the contents of which are hereby incorporated by reference herein in their entirety.

BACKGROUND OF THE INVENTION

1. Field of the Invention

The present invention relates to a mobile terminal, and more particularly, to a mobile terminal and method of managing a schedule using the same. Although the present invention is suitable for a wide scope of applications, it is particularly suitable for processing applications linking to a schedule.

2. Discussion of the Related Art

Generally, contents received via SMS (short message service) or email by a terminal are checked and a meeting or conference schedule is inputted to a schedule table. In doing so, it is inconvenient to input the corresponding information to the schedule table through a series of procedures.

SUMMARY OF THE INVENTION

Accordingly, the present invention is directed to a mobile terminal and method of managing a schedule using the same that substantially obviate one or more problems due to limitations and disadvantages of the related art.

An object of the present invention is to provide a mobile terminal and method of managing a schedule using the same, by which a schedule table function linked to a prescribed application can be performed.

Another object of the present invention is to provide a mobile terminal and method of managing a schedule using the same, by which the inconvenience to input received information to a schedule table can be resolved.

A further object of the present invention is to provide a mobile terminal and method of managing a schedule using the same, by which hours and date of a preset schedule can be changed using a schedule table having different units of periods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal is characterized in performing a schedule management in the course of running an application in a manner of linking the schedule management and the application to each other.

In another aspect of the present invention, a mobile communication terminal according to the present invention includes a display unit configured to display target item information including a schedule according to an execution of a prescribe application, an input device configured to receive a user's control selection signal for the target item information displayed via the display unit, and a control unit configured to output a control signal for the target item information according to the user's control selection signal received via the input device.

Preferably, the control unit performs one action selected from the group consisting of store, shift, check and delete of a target item in a schedule table of a calendar type according to the user's control selection signal.

Preferably, the target item is represented as a symbol for a prescribed one selected from the group consisting of an icon, an avatar, a name and a group name on the schedule table of the calendar type.

More preferably, the symbol can be set by the user.

Preferably, the prescribed application includes one selected from the group consisting of a shirt message service, a multimedia service, an email and a schedule.

Preferably, the target item on the schedule table is provided with a view restriction function for secret maintenance.

In another aspect of the present invention, a method of managing a schedule using a mobile communication terminal includes the steps of displaying target item information including the schedule by executing a prescribe application, receiving a user's control selection signal for the target item information, and performing a control over the target item information according to the user's control selection signal received via the input device.

In another aspect of the present invention, a method of managing a schedule using a mobile communication terminal includes the steps of displaying a first schedule table set by a first period unit by including at least one schedule information, changing a position of a specific schedule in the at least one schedule information on the first schedule table according to a user's first input via a user input unit, displaying a second schedule table set by a second period unit shorter than the first period unit by including a point corresponding to the changed position, and changing at least one of a position and a period of the specific schedule according to a user's second input via the user input unit.

In a further aspect of the present invention, a mobile terminal includes a touchscreen configured to recognize a touch input of a user and a controller displaying a first schedule table set by a first period unit, the first schedule table configured to include at least one schedule information, the controller, if a position of a specific schedule in the at least one schedule information is changed on the first schedule table according to a user's first input via the touchscreen, displaying a second schedule table, the controller controlling at least one of a position and a period of the specific schedule to be changed according to a user's second input via the touchscreen, wherein the second schedule table is set by a second period unit shorter than the first period unit by including a point corresponding to the changed position.

Accordingly, the present invention provides the following effects and/or advantages.

First of all, the present invention is able to resolve the inconvenience to move the information included in a received message or mail to a schedule table.

Secondly, the present invention facilitates schedule change information to be handled on schedule tables of various types.

Thirdly, the present invention facilitates schedule management.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3A and FIG. 3B are front diagrams of a mobile terminal according to one embodiment of the present invention for explaining one operational status of the mobile terminal, respectively;

FIG. 20 is a diagram of one example for a method of changing a schedule section on a second schedule table according to another embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
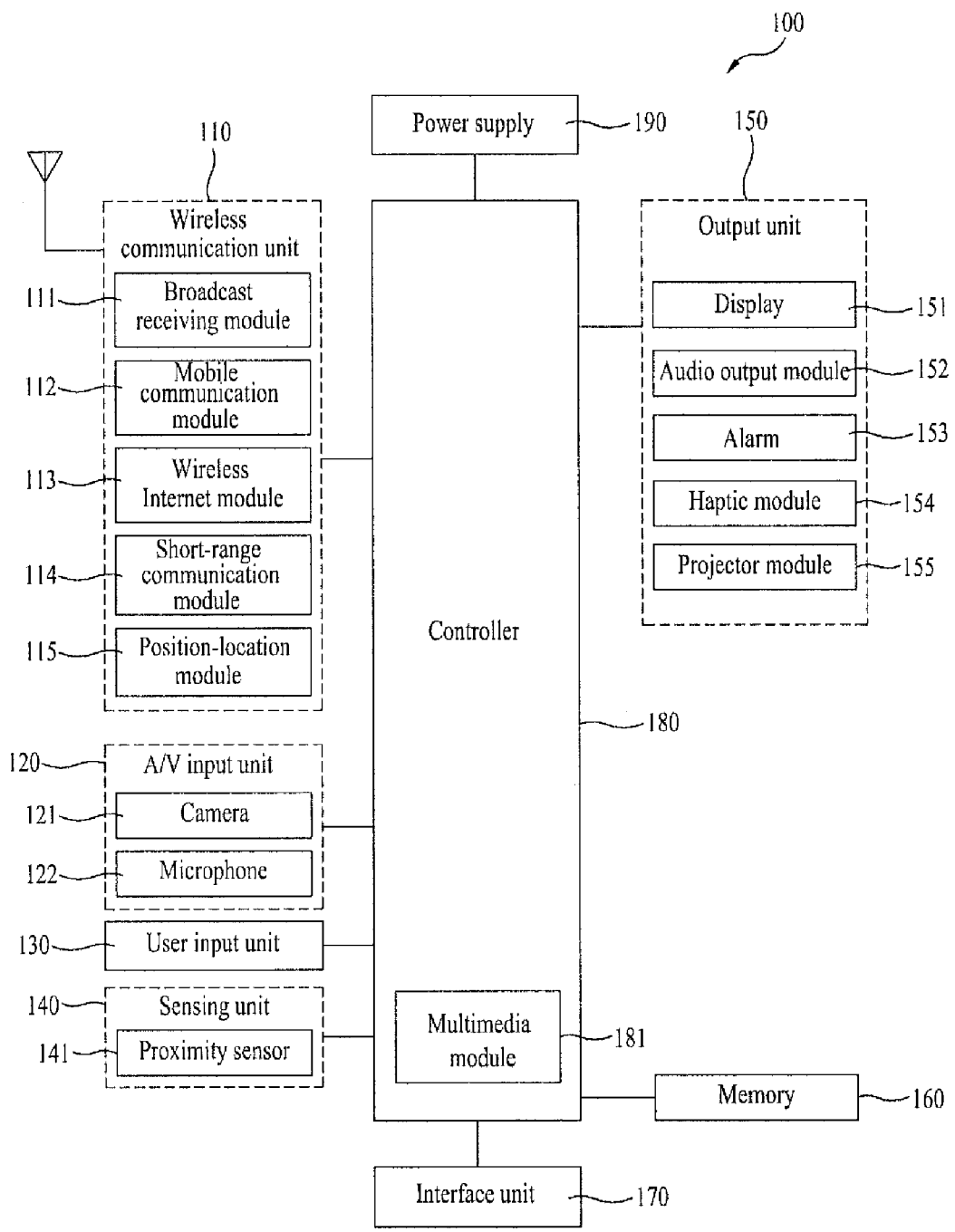
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Also, the user input unit 160 may further include one or more Hot-keys. The Hot-key may be a switch or a button which can be provided on an arbitrary part of the outer case. When the Hot-key is manipulated, a shortcut function to a specific application, e.g., a calendar typed scheduler according to one embodiment of the present invention, can be provided without executing multiple menu selection procedures.

Figure 2A:
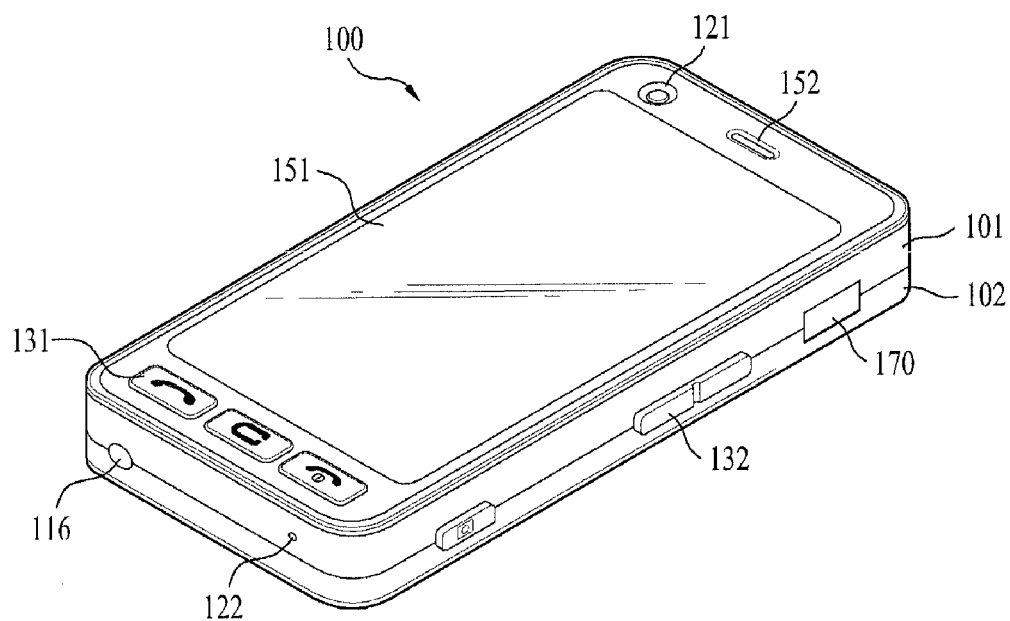
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
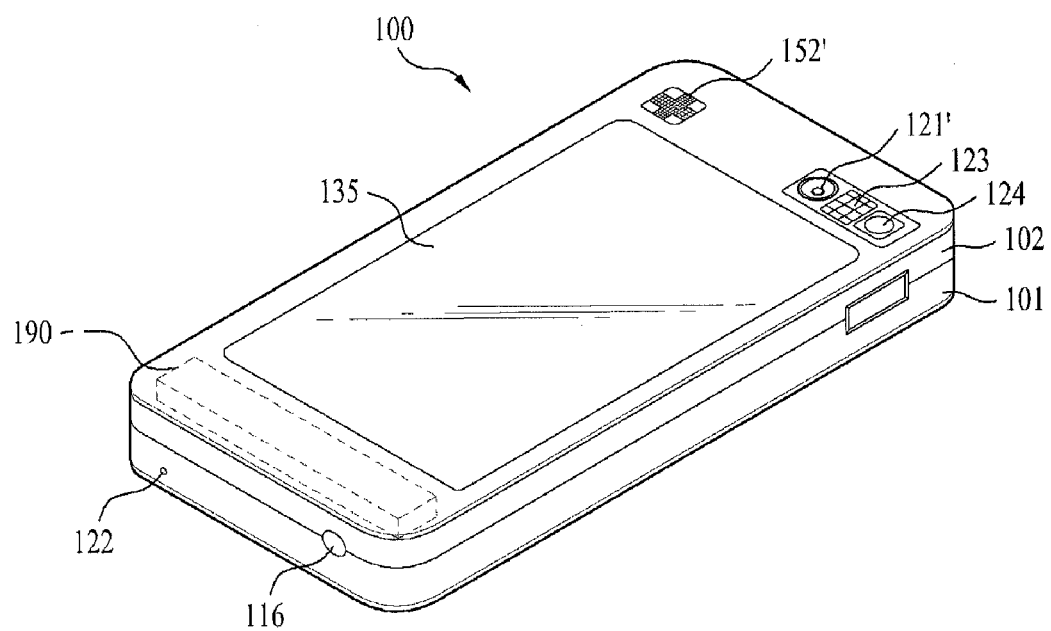
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Interconnected operational mechanism between the display 151 and the touchpad 135 are explained with reference to FIG. 3A and FIG. 3B as follows.

Figure 3A:
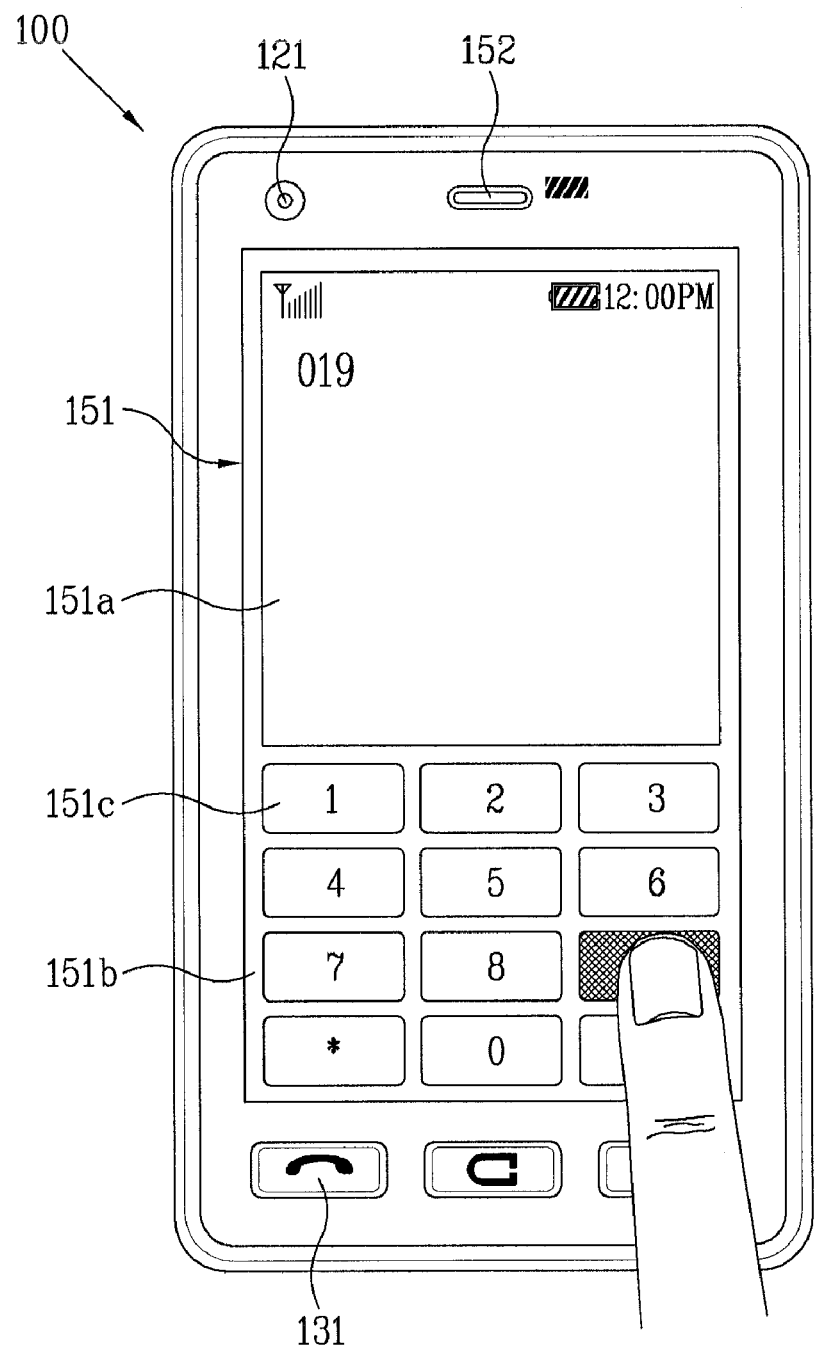

FIG. 3A and FIG. 3B are front-view diagrams of a terminal according to one embodiment of the present invention for explaining an operational state thereof.

First of all, various kinds of visual informations can be displayed on the display 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display 151 can be configured to change an output picture according to the arranged direction of the terminal body.

FIG. 3B shows that a text input mode is activated in the terminal.

An output window 151a' and an input window 151b' are displayed on the display 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display 151. In case that the display 151 and the touchpad 135 are configured transparent, it is able to visually check fingers located at the backside of the terminal body. Hence, more correct touch inputs are possible.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

The proximity sensor 141 described with reference to FIG. 1 is explained in detail with reference to FIG. 4 as follows.

Figure 4:
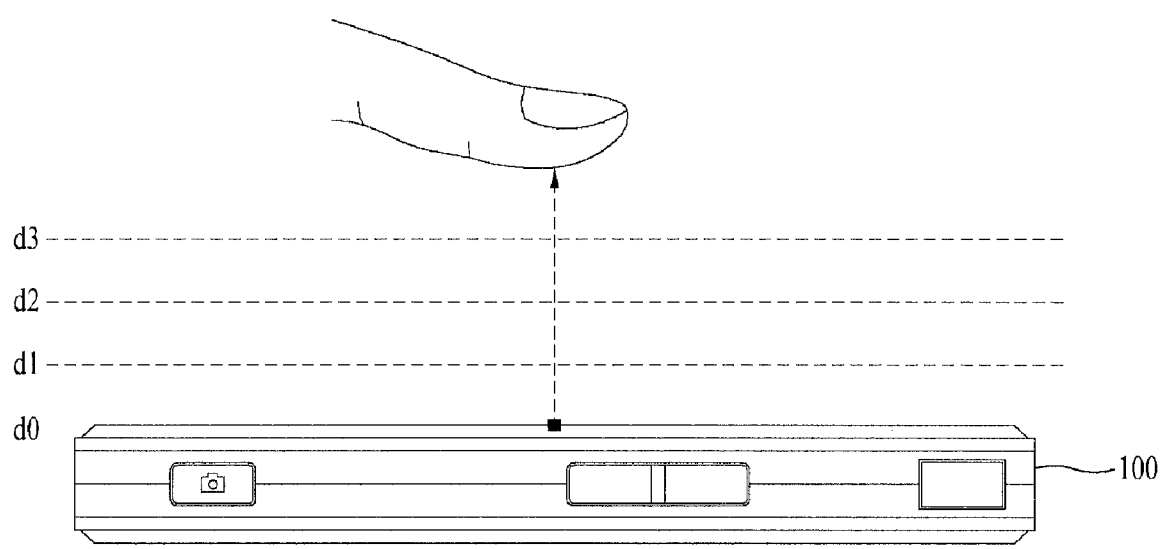
FIG. 4 is a diagram to explain the concept of proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

In the following description, a communication system, in which a terminal according to the present invention is operational, is explained with reference to FIG. 5.

First of all, a communication system is able to use different radio interfaces and/or physical layers. For instance, radio interfaces available for a communication system can include Frequency Division Multiple Access (FDMA), Time Division Multiple Access (TDMA), Code Division Multiple Access (CDMA), Universal Mobile Telecommunications Systems (UMTS) (particularly, LTE (Long Term Evolution)), Global System for Mobile Communications (GSM), etc. For clarity and convenience, the following description is limited to CDMA. Yet, it is a matter of course that the present should be applicable to all kinds of communication systems as well as the CDMA wireless communication system.

Figure 5:
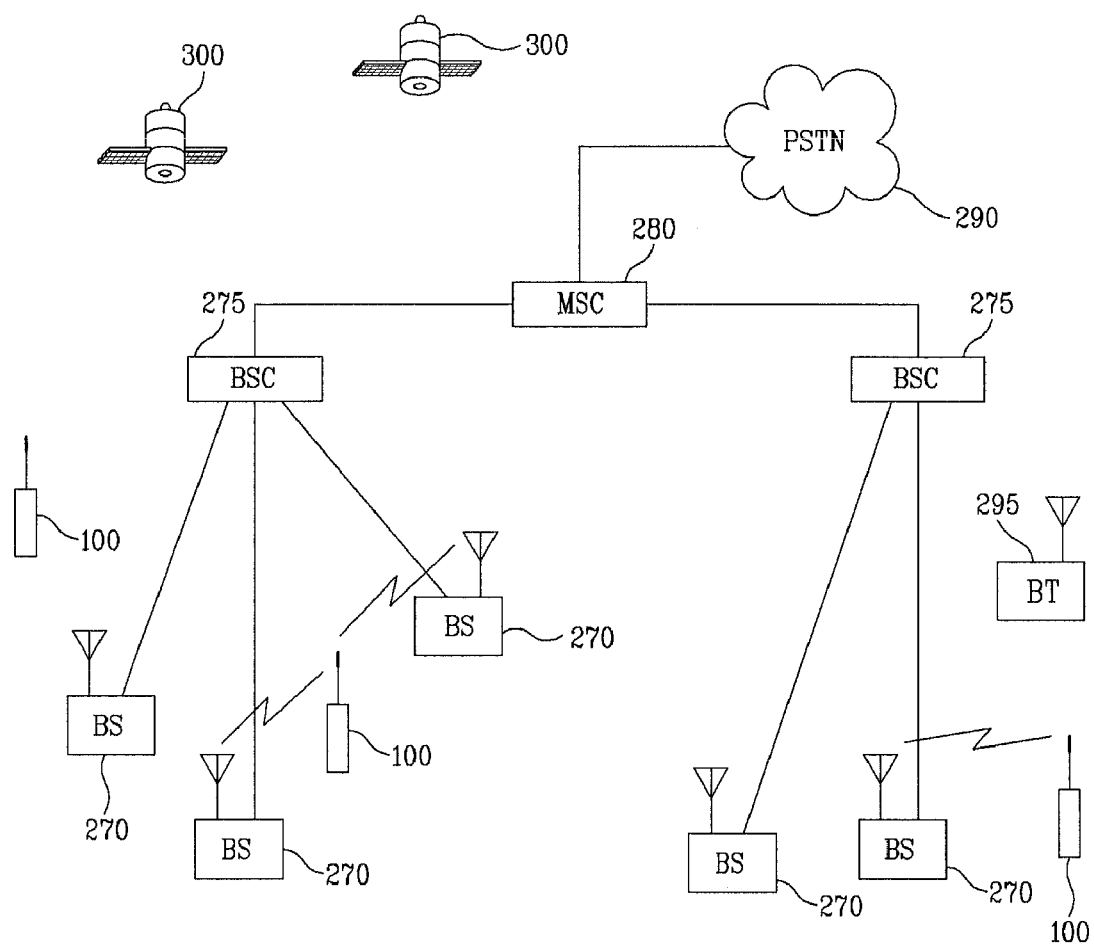
FIG. 5 is a diagram of an example for a communication system in which a terminal according to the present invention is operational.

FIG. 5 is a diagram of an example for a communication system in which a terminal according to the present invention is operational.

First of all, a communication system is able to use different radio interfaces and/or physical layers. For instance, the radio interfaces available for the communication system can include Frequency Division Multiple Access (FDMA), Time Division Multiple Access (TDMA), Code Division Multiple Access (CDMA), Universal Mobile Telecommunications Systems (UMTS) (specifically, LTE (Long Term Evolution)), Global System for Mobile Communications (GSM), and the like. The following description, for clarity and convenience, is limited to CDMA only. Yet, it is a matter of course that the present invention is applicable to all kinds of communication systems including CDMA wireless communication system Referring to FIG. 5, a CDMA wireless communication system can include a plurality of terminals 100, a plurality of base stations (hereinafter abbreviated BS) 270, a plurality of base station controllers (hereinafter abbreviated BSC) 275, and a mobile switching center (hereinafter abbreviated MSC) 280. The MSC 280 is configured to be connected to a public switched telephone network (hereinafter abbreviated PSTN) 290 and is also configured to be connected to a plurality of the BSCs 275. Each of the BSCs 275 can be connected to the MSC 280 by forming a pair with the BS 270 via a backhaul line. In this case, the backhaul line can be provided according to at least one of E1/T1, ATM, IP, PPP, Frame Relay, HDSL, ADSL and xDSL. Therefore, a plurality of the BSCs 275 can be included in the system shown in FIG. 5.

Each of the BSs 270 can include at least one or more sectors. Each of the sectors can include an omni-directional antenna or an antenna indicating a specific radial direction from the corresponding BS 270. Alternatively, each of the sectors can include at least two antennas of various types. Each of the BSs 270 can be configured to support a plurality of frequency allocations. IN this case, each of a plurality of the frequency allocations has a specific spectrum (e.g., 1.25 MHz, 5 MHz, etc.).

Crossing between the sector and the frequency allocation can be called a CDMA channel. The BS 270 can be called a base station transceiver subsystem (BTS). In this case, a terminology 'base station' can indicate a combination of one BSC 275 and at least one BS 270. Moreover, a base station can indicate a cell site. Each of the sectors for a specific BS 270 can be called a plurality of cell sites.

Referring to FIG. 5, a broadcasting transmitter (hereinafter abbreviated BT) 295 transmits broadcast signals to a plurality of the terminals 100 operated within the system. The broadcast module 111 shown in FIG. 1 is provided within the terminal 100 to receive the broadcast signals transmitted by the BT 295.

Besides, a plurality of global positioning systems (hereinafter abbreviated GPS) satellites 300 are shown in FIG. 5. Each of the satellites 300 helps to obtain a position of at least one of a plurality of the terminals 100. Although two satellites are shown in FIG. 5, useful position information can be acquired using satellites more or less than 2. The GPS module 115 shown in FIG. 1 cooperates with the satellites 300 to acquire specific position information. In doing so, positions can be traced using every technology as well as the GPS tracking technology. Moreover, at least one of the GPS satellites 300 can be responsible for satellite DMB transmission optionally or additionally.

While the wireless communication system is typically operating, the BS 270 receives backward link signals from a plurality of the terminals 100. Each of the terminals 100 connects a call, receives/sends a message, or performs other communication operations. Each of the backward link signals received by the specific BS 270 is processed by the specific BS 270. Data generated from the processing is transmitted to the connected BSC 275. In this case, the BSC 275 provides such a function as call resource allocation, mobility management, organization of soft handoffs between the BS 270, and the like. The BSC 275 transmits the received data to the MSC 280. And, the BSC 275 provides an additional transmission service for the connection to the PSTN 290. Similarly, the PSTN 290 is connected to the MSC 280, the MSC 280 is connected to the BSCs 275, and each of the BSCs 275 controls the BSs 270 to transmit forward link signals to the terminals.

<First Embodiment>

FIGS. 6A to 6F are diagrams of examples for screen configurations in progress of a method of managing a schedule according to one embodiment of the present invention.

First of all, the present invention relates to a method of processing a function of short message service (SMS), multimedia, email or the like by linking it to a schedule function. The following description regards the short message service, by which the present invention is non-limited.

Figure 6A:
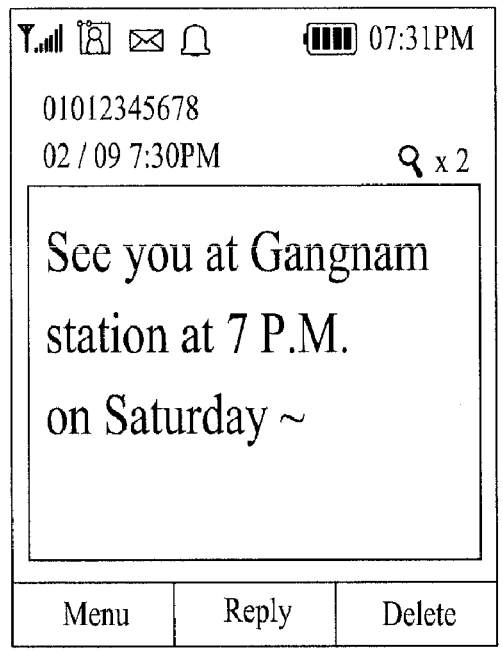
FIGS. 6A to 6F are diagrams of examples for screen configurations in progress of a method of managing a schedule according to one embodiment of the present invention.
Figure 6B:
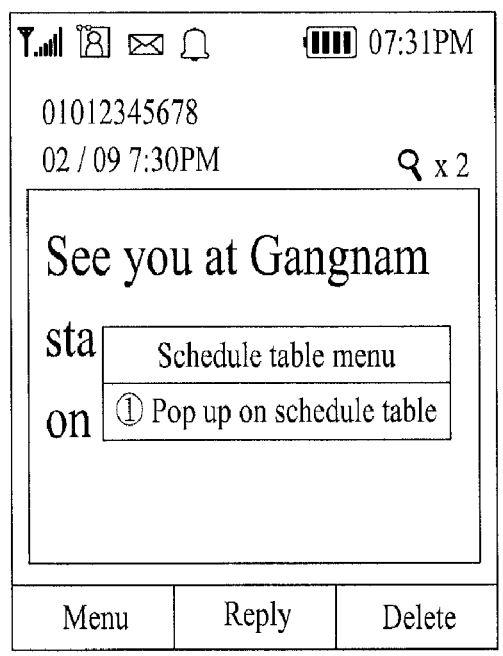

When an SMS message is received, FIG. 6A shows a screen on which contents of the received SMS message are displayed to be checked.

Thus, a corresponding message can be stored by being linked to a schedule table on a text message check picture (outgoing, incoming or outgoing/incoming combined list). For instance, when a hotkey 'schedule table' provided to a prescribed portion of a terminal is pressed, a guide message is displayed on the screen [FIG. 6B]. If a user selects such a menu as 'pop up on schedule table' and 'store in schedule table', it is able to store a currently received and contents-confirmed message in the schedule table.

Figure 6C:

For instance, assuming that today is February referring to FIG. 6C, an icon indicating a message is displayed on a memo box of February 9 that is a current date is displayed on the schedule table. In this case, contents of the message are included as contents of schedule and a schedule alarm hour can be set to a current hour.

For another instance, assuming a date of message transmission or reception is February 1, referring to FIG. 6C, an icon indicating a message is displayed on a memo box of February 9 that is a current date is displayed on the schedule table. In this case, contents of the message are included as contents of schedule and a schedule alarm hour can be set to an hour of the message transmission or reception.

Figure 6D:
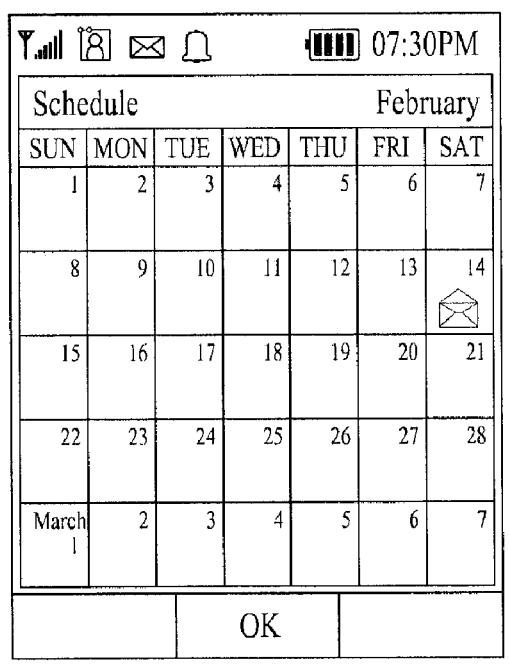
Figure 6E:
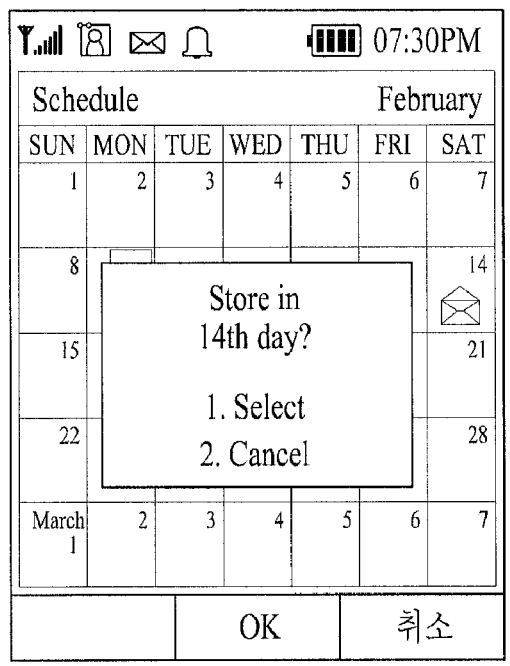
Figure 6F:
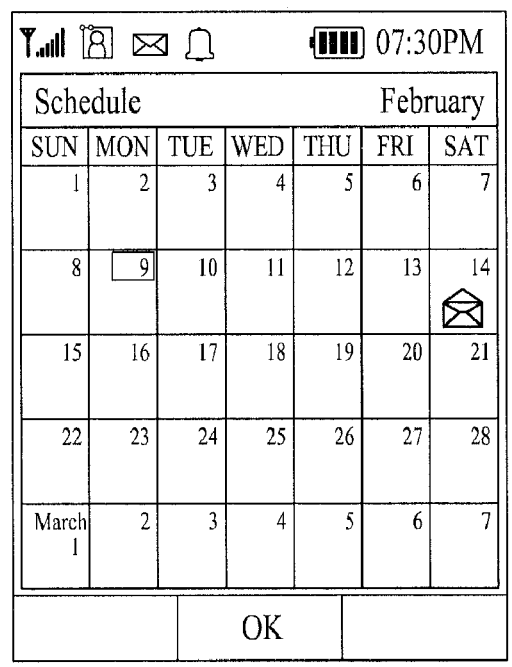

Subsequently, referring to FIG. 6D, the message is dragged to the day $14^{th}$. If so, referring to FIG. 6E, a message for querying a user's selection about whether to store in the schedule table can be displayed. In doing so, the drag of the message can be performed using a direct touch or a proximity touch.

If the user shows an intention to store the corresponding message as a schedule of the day $14^{th}$ in the schedule table, the message is displayed on the schedule table.

Meanwhile, it is able to perform the schedule table storing function on a received and listed message.

Figure 7A:
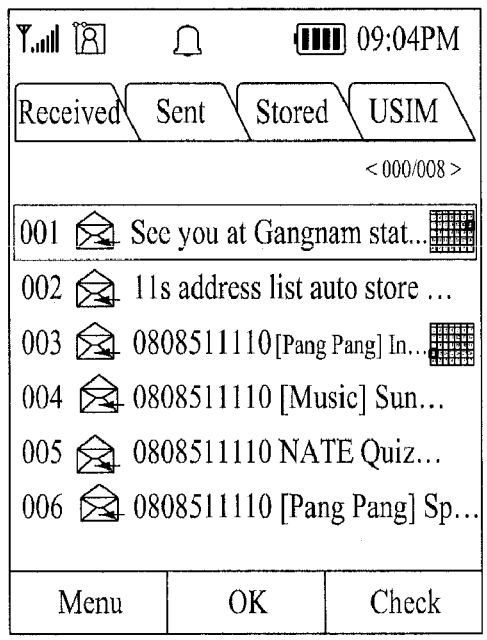
FIG. 7A and FIG. 7B are diagrams of examples for screen configurations in progress of a method of managing a schedule according to another embodiment of the present invention.
Figure 7B:
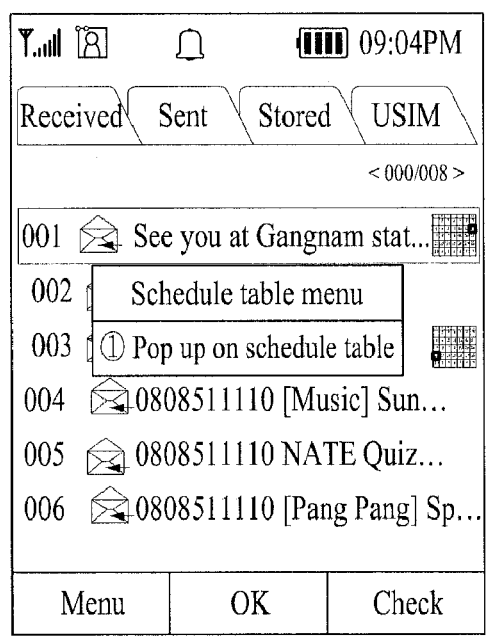

FIG. 7A and FIG. 7B are diagrams of examples for screen configurations in progress of a method of managing a schedule according to another embodiment of the present invention.

Referring to FIG. 7A, while an application for displaying a text message list represented as a list is performed, it is able to perform a schedule management function in the manner shown in the above example.

For instance, in a transmitted or received message list mode, information included in a prescribed message can be stored in a schedule table. And, an icon indicating a presence or non-presence of the information can be displayed on one side of the list.

In a message list display mode, a schedule table hotkey provided to a prescribed portion is pressed, referring to FIG. 7B, a guide message is displayed on the screen. If a user selects a menu such as 'pop up on schedule table' and 'store in schedule table', a currently received and contents-confirmed message can be stored in the schedule table. A series of actions to store the information can be performed in the same manner of the above description. In particular, the message icon displayed on the schedule table is dragged & dropped to a specific date or a specific date is inputted to a date input item displayed on the screen. Optionally, by simply dragging & dropping the icon, an alarm date can be automatically changed without changing contents and alarm hour of the schedule. If alarm hour editing is necessary, an editing menu can be selected and entered.

Alternatively, after the function of 'pop up on the schedule table' has been selected, a window for inputting a date to add is displayed.

Figure 8A:
FIGS. 8A to 8D are diagrams of examples for screen configurations of a controlling process in schedule display mode.
Figure 8B:
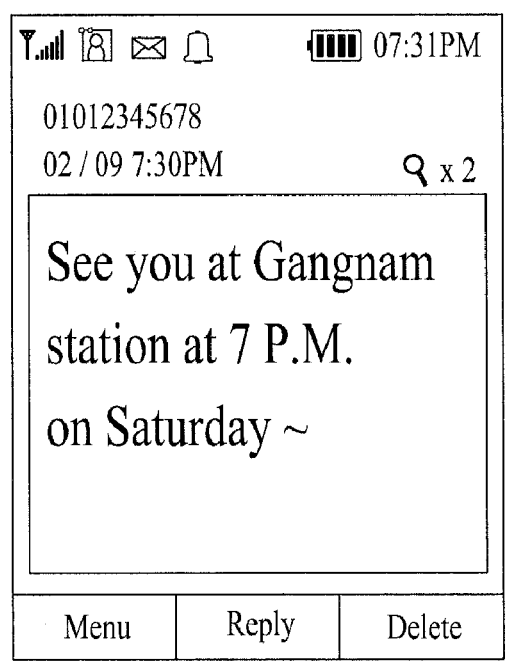

Meanwhile, regarding the information already registered with the schedule table of a calendar type, if a symbol displayed on the schedule table is selected using a finger or the like [FIG. 8A], a corresponding application is executed to enable a user to check the contents of the information [FIG. 8B].

Meanwhile, in case that a plurality of schedules are registered with a schedule table of a calendar type, when a plurality of schedules of the same type (e.g., letter icon if a schedule is registered from a message) exist, a single letter icon is displayed only. If the corresponding letter icon is touched or proximity touch is performed on the letter icon, a schedule list is displayed on a bottom end of the schedule table. If one of the schedules is selected from the schedule list, a user is able to check details.

Figure 8C:
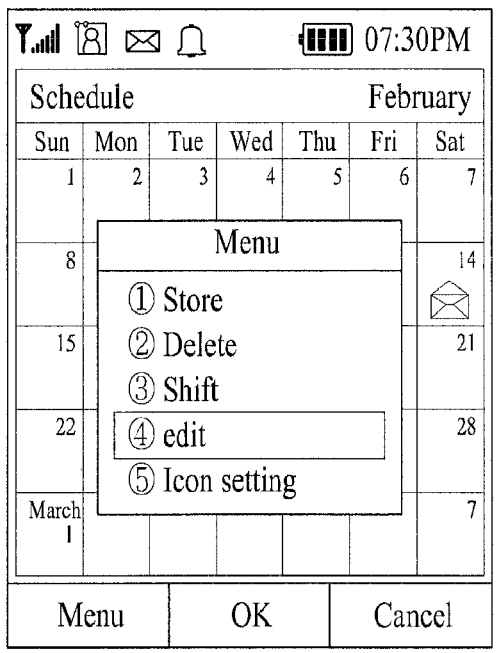
Figure 8D:
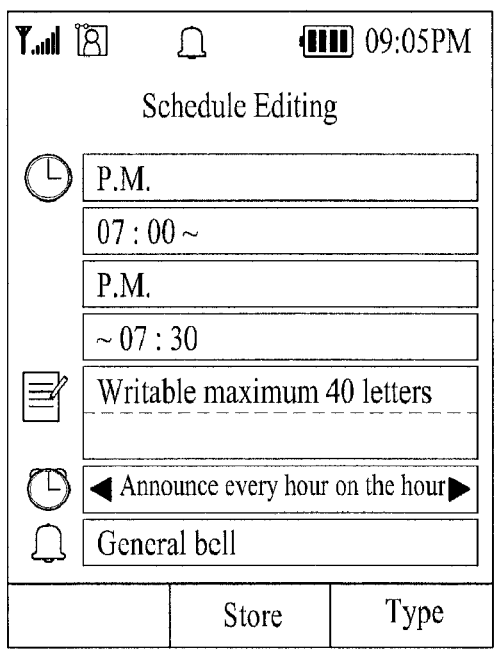

A plurality of submenus can be provided to a schedule table menu [FIG. 8C]. A plurality of the submenus can be implemented despite that the application is being executed. The submenus can include various menus including 'store', 'move', 'delete', 'edit', 'icon setting' and the like. If a user selects the submenu 'edit', alarm date and/or alarm hour can be edited in a settable form in the schedule table based on the corresponding information [FIG. 8D]. Alternatively, an editing of setting an alarm our can be performed by leaving the message contents intact.

Figure 9:
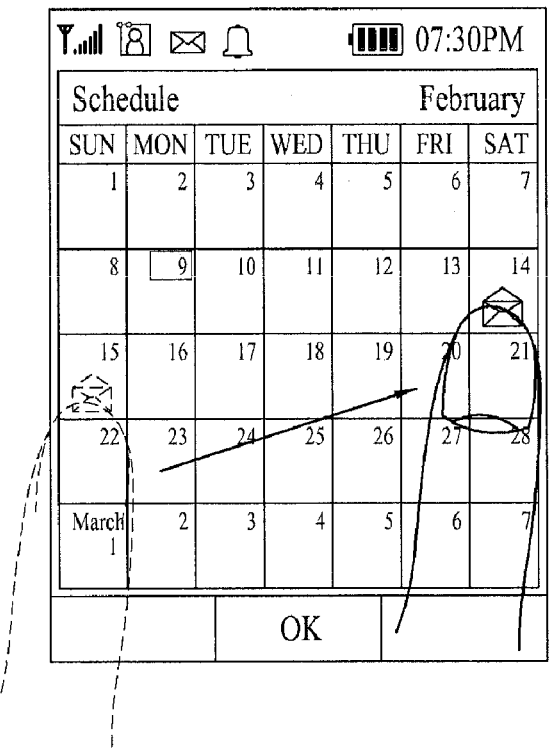
FIG. 9 is a diagram of an example for implementation of an item in schedule display mode.

If a user selects the submenu 'move', referring to FIG. 9, a prescribed target item on a schedule table can be selected and moved by drag & drop. Meanwhile, this move function can be implemented by drag & drop on a schedule table as well as the menu.

Figure 10:
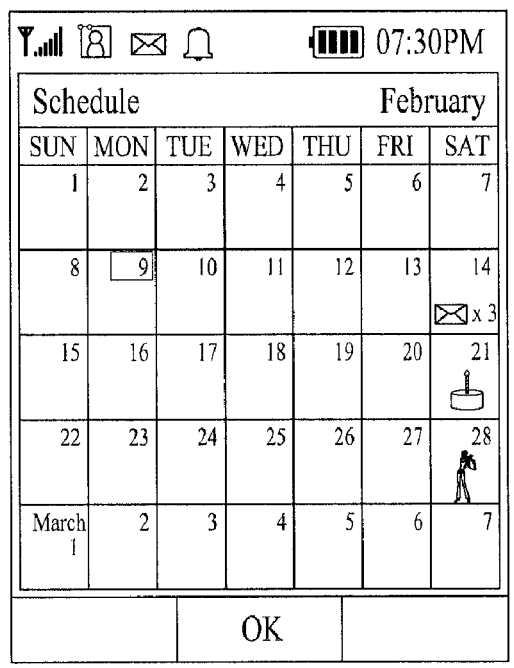
FIG. 10 is a diagram of an example for items displayed as various symbols on a schedule table.

Information displayed on the schedule table can be represented as symbols of various types. Each of the symbols, as shown in FIG. 10, can include one of an icon, an avatar, a name and a group name. And, the corresponding symbols can be determined by a user. For instance, a user pages the menu function on the schedule table, selects a function 'icon setting', and is then able to select one of a plurality of icons (not shown in the drawing) stored in the terminal.

Figure 11:
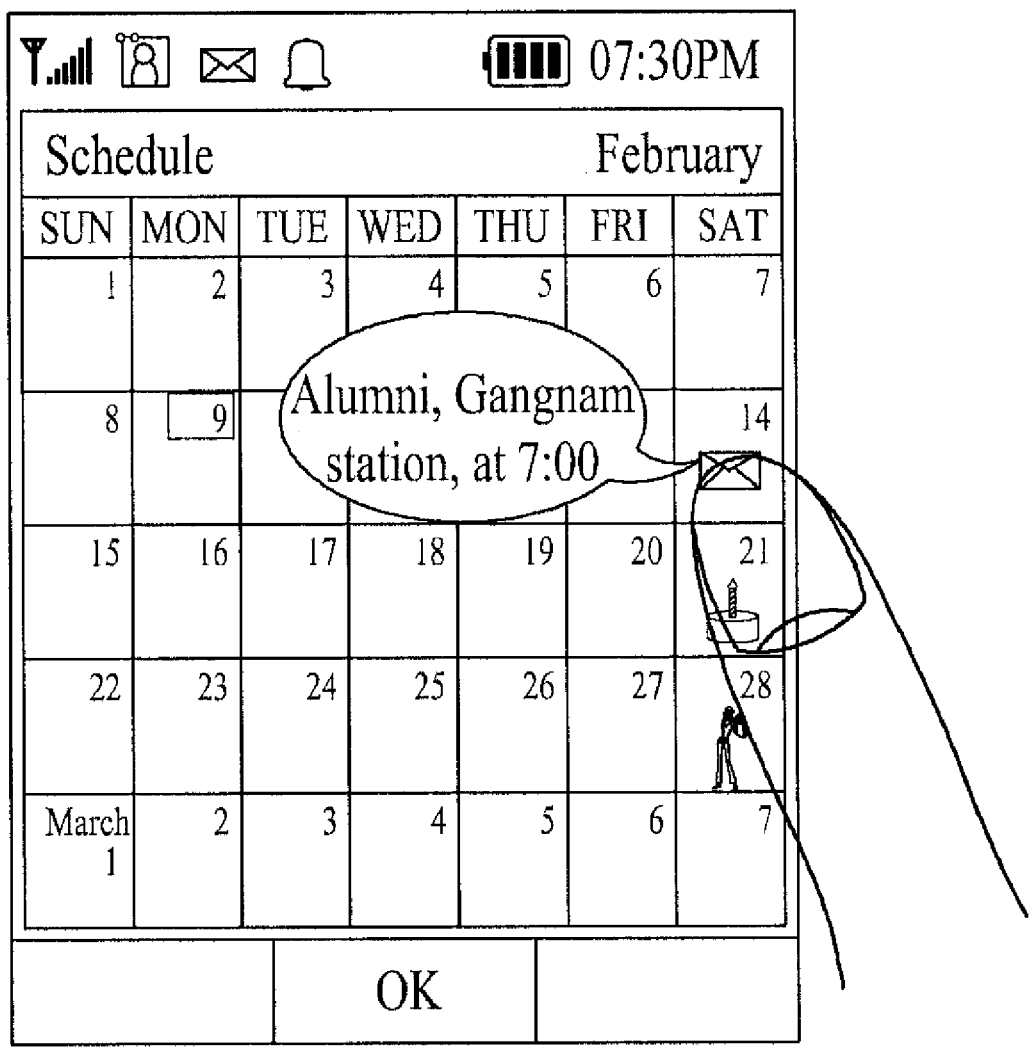
FIG. 11 is a schematic diagram of an example for displaying item information on a schedule table.

A user performs a direct touch or a proximity touch on a symbol displayed on a schedule table to display whole contents. Alternatively, the contents can be partially represented as a word balloon, as shown in FIG. 11.

Alternatively, although an item is represented as a symbol on a schedule table, if a user attempts to hide the corresponding contents from others, the user sets a password and represents a locked state of the password setting as a separate icon.

And, it is understood that a password input and unlock procedure for revealing the corresponding item is a general procedure, of which details shall be omitted from the following description.

Thus, when at least one of elements including a content, an alarm date, an alarm hour and the like is added to a schedule table or is changed despite being added, the added or changed content can be shared with another device by executing a schedule sharing program via Bluetooth, PC Sync or the like.

FIG. 12 shows a schedule adding procedure in photo photographing and album review.

Figure 12A:
FIG. 12 is a diagram of an example for implementation of performing an operation linked to a schedule table after completion of photographing.
Figure 12B:
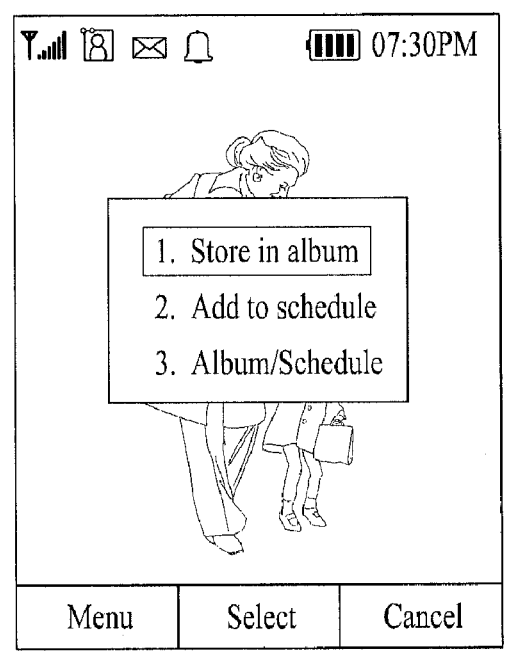

If a user shows an intention to store a photo after photo photographing [FIG. 12A], a store guide message is displayed [FIG. 12B]. A storage region is added not to 'album view' bit to schedule'. After photographing, a user is able to simultaneously add the storage region to a plurality of regions including 'photo album view', 'schedule' and the like.

Figure 12C:
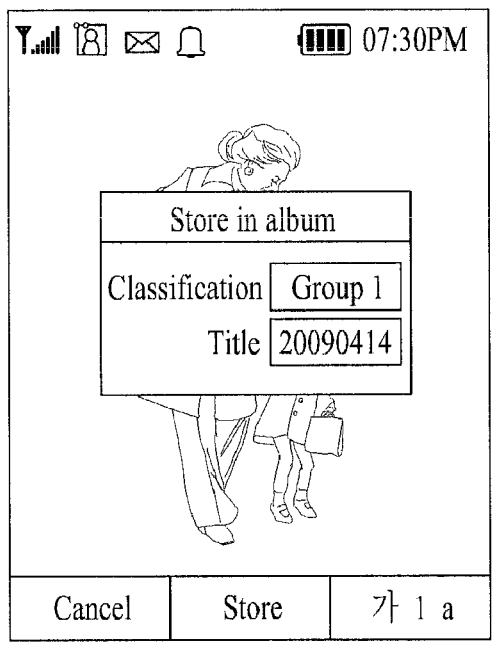

If a user stores a photo in a general album, a picture for inputting a storage group of the picture and a title of the picture is provided [FIG. 12C]. In doing so, a photographing date can be automatically stored.

Figure 12D:
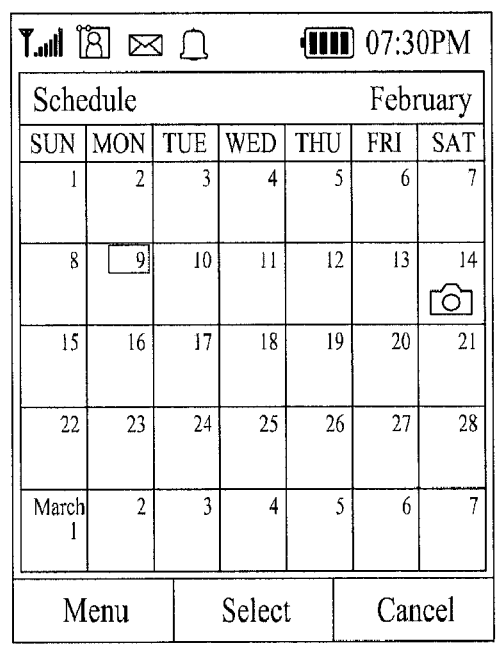

If a user selects 'add to schedule', referring to FIG. 12D, a schedule table is displayed and a photo can be added to the corresponding schedule table by being synchronized with a photographed date. Of course, as mentioned in the foregoing description, a displayed icon is stored in a specific date by drag & drop of direct touch or proximity touch or a date can be directly inputted.

In case that a user adds a storage region to a schedule or both an album view and a schedule after photographing, the user is requested either to select one of previously stored schedules or to add a schedule. Based on the selected or added schedule, information of the corresponding image is automatically stored as a name of corresponding schedule_photographed date.

Figure 12E:
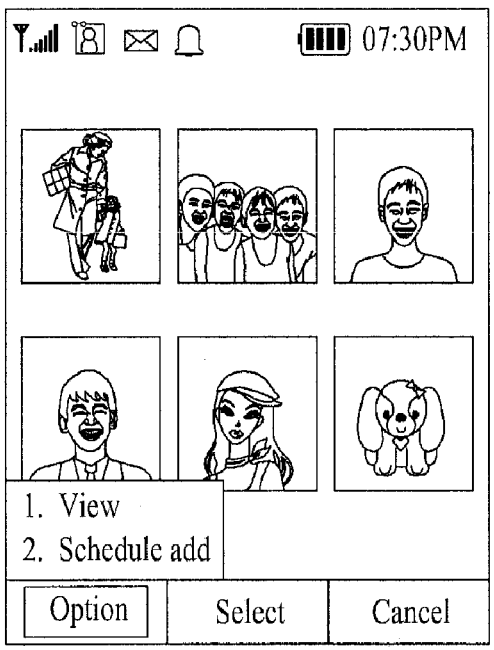
Figure 12F:

Referring to FIG. 12E, if a user selects an option menu from 'view album', an option for addition to schedule is displayed. If 'add schedule' is selected, the user is requested either to select one of previously stored schedules or to add a schedule.

Based on the selected or added schedule, information of the corresponding image is changed into schedule_photographed date or schedule_schedule added date. The information is added to a schedule table by being synchronized with a corresponding photographed date or a corresponding schedule added date or can request a user to input a date to add.

Thus, it is able to search related images according to a search keyword in 'album view' or 'schedule'.

The image added to the schedule table can be displayed in a manner of being overlaid as a thumbnail image over a corresponding date in the schedule table.

Figure 12G:
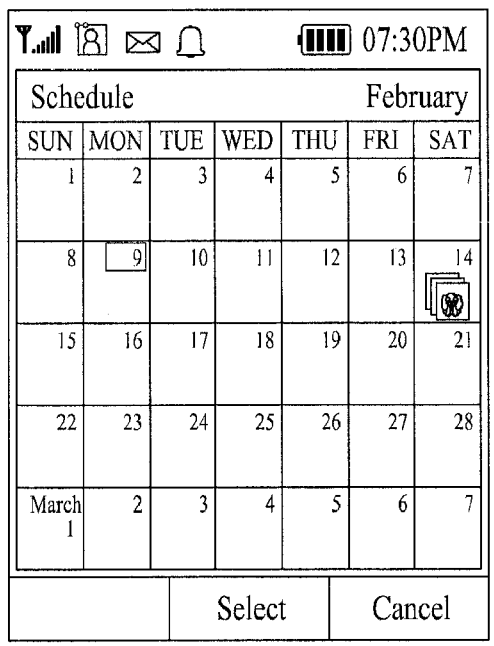
Figure 12H:
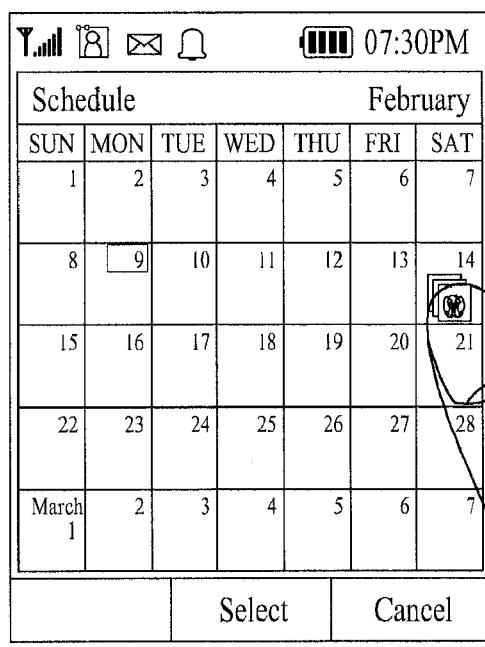
Figure 12I:
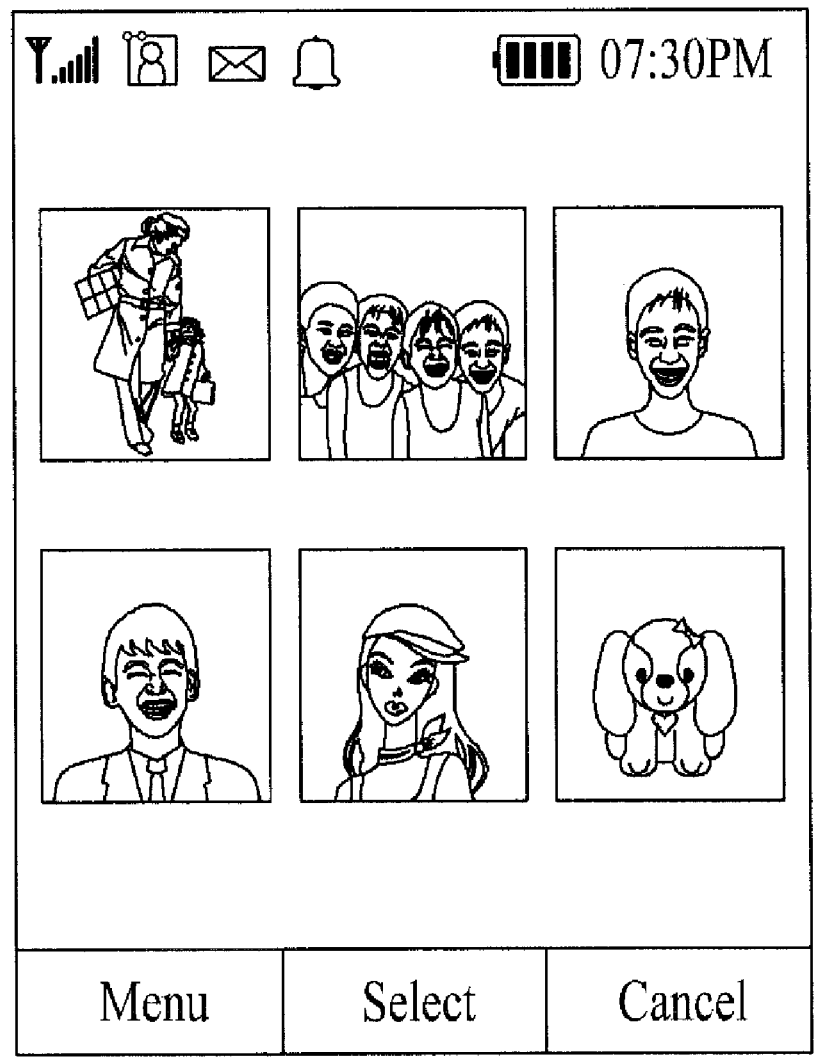

In case that several image exist on the corresponding date, a latest photographed thumbnail image is displayed by being overlaid [FIG. 12G]. If a user selects the corresponding latest thumbnail image [FIG. 12H], the several thumbnail images are displayed in a manner of being unfolded as horizontal planar figures, vertical planar figures, circular planar figures, square planar figures (unfolded in cross type) or the like [FIG. 12I]. It is then able to perform deletion, shift, enlarge & view, editing and the like by selecting a portion of the several unfolded thumbnail images at least.

If the shift of the selected thumbnail images is selected, informations of the thumbnail images can be modified in part at least. For instance, a date in schedule_photographed date or schedule_schedule added date can be automatically modified into a shifted date. In case of attempting to change a target or title of a schedule, a user presses an edit menu and is then able to directly change the target or title of the schedule.

FIG. 13 shows a schedule adding procedure in a drawing memo or a text memo.

Figure 13A:
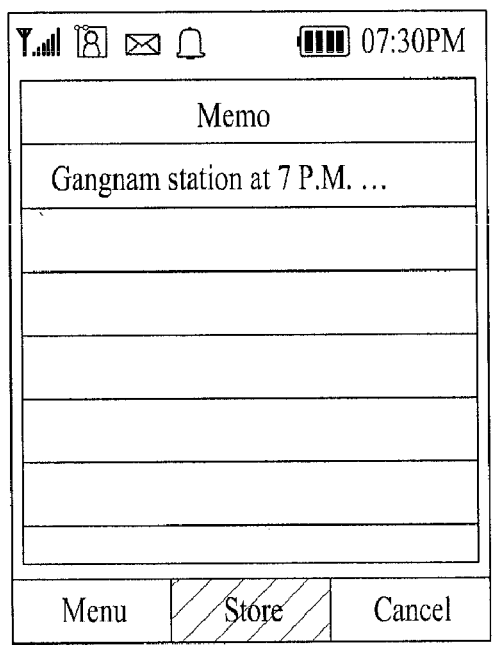
FIG. 13 is a diagram of an example for implementation of performing an operation linked to a schedule table after completion of memo writing.
Figure 13B:
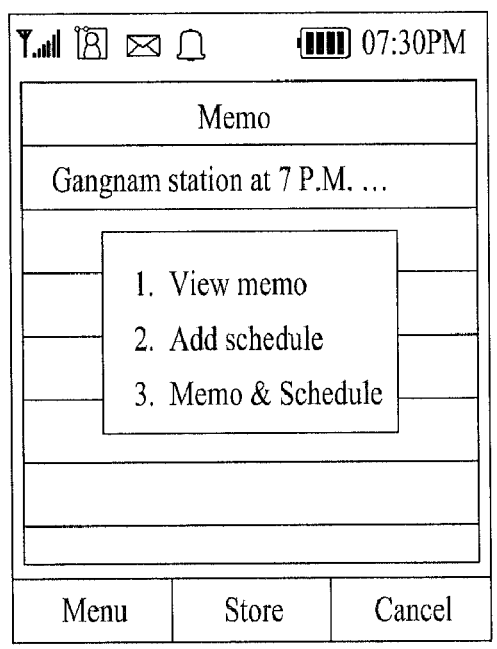

If a user having written a memo stores 'store' [FIG. 13A], a guide message for storage region selection is displayed [FIG. 13B]. The user adds a storage region not to 'view memo' but to 'schedule' or is able to simultaneously add the storage region to a plurality of regions including 'memo view', 'schedule' and the like.

Figure 13C:
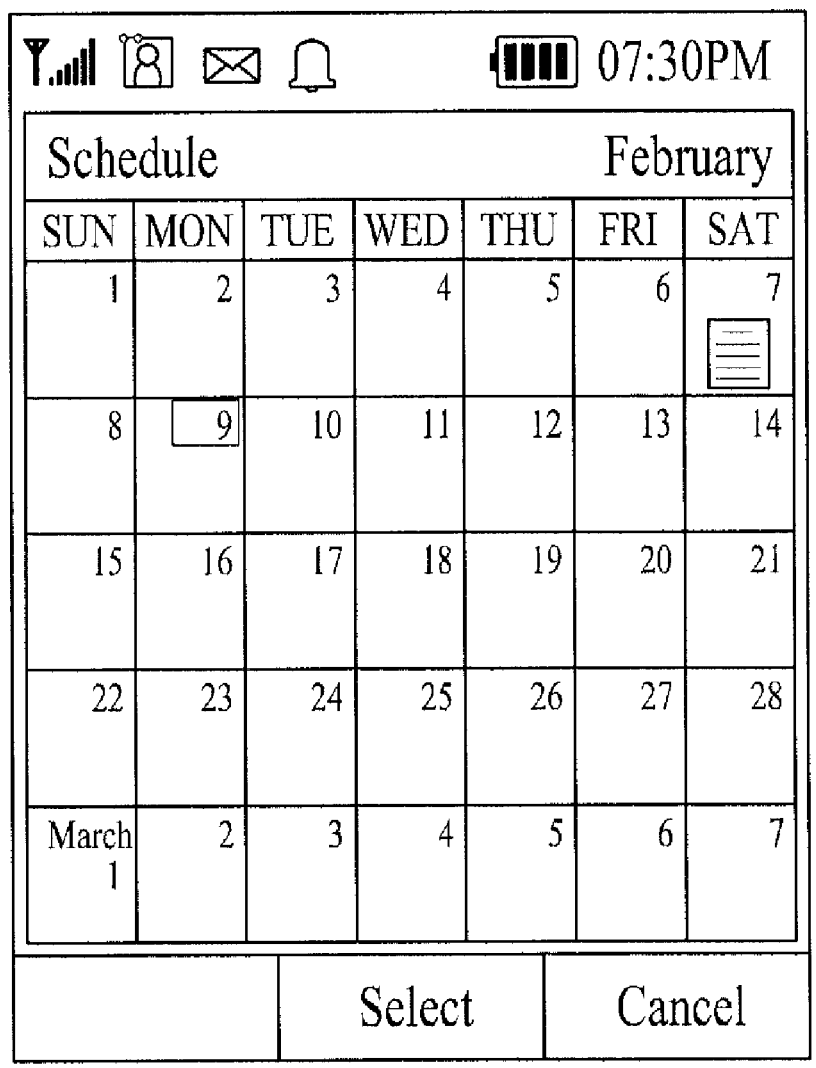

Thus, when the memo is added to the schedule, a corresponding icon is added to a schedule table by being synchronized with a memo written date [FIG. 13C]. In case of a memo written in the course of a call, a corresponding icon is added to a schedule table based on a call date. Such an operation as 'memo shift', 'memo delete' and the like in the schedule addition of memo or the schedule table is performed in a manner similar to that of the above description of the interoperation of the photo and the schedule table.

In this case, the memo includes a drawing memo or a text memo inputted by handwriting recognition (or typing).

In case that a user adds a storage region to a schedule or both an album view and a schedule after the memo writing, the user is requested either to select one of previously stored schedules or to add a schedule. Based on the selected or added schedule, information of the corresponding memo is automatically stored as a name of corresponding schedule_memo written date.

If a user selects an option menu from 'view memo', an option for addition to schedule is displayed. If 'add schedule' is selected, the user is requested either to select one of previously stored schedules or to add a schedule. Based on the selected or added schedule, information of the corresponding memo is changed into schedule_written date or schedule_schedule added date. The information is added to a schedule table by being synchronized with a corresponding written date or a corresponding schedule added date or can request a user to input a date to add.

Thus, it is able to search related memos according to a search keyword in 'memo view' or 'schedule'.

In case that several memos exist, a latest written memo icon is displayed. If a user selects a corresponding latest memo, several memo icons are displayed in a manner of being unfolded as horizontal planar figures, vertical planar figures, circular planar figures, square planar figures (unfolded in cross type) or the like. It is then able to perform deletion, shift, view details, editing and the like by selecting a portion of the several unfolded memos at least.

If the shift of the selected memos is selected, informations of the memos can be modified in part at least. For instance, a date in schedule memo date or schedule_schedule added date can be automatically modified into a shifted date. In case of attempting to change a target or title of a schedule, a user presses an edit menu and is then able to directly change the target or title of the schedule.

Thus, when the message, image, memo or the like added to the schedule table is deleted from the schedule table, it is deleted from the schedule table only or can be simultaneously deleted from such an application associated with a corresponding item as 'message', 'view album', 'write memo', 'view' and the like.

When the message, image, memo or the like added to the schedule table shares the schedule with another device, a content, alarm date and alarm hour of the schedule are shared and each item linked to the content can be shifted to a folder for uploading the corresponding item. For instance, a message, an image, a memo and the like can be shared with another device by being included in item upload related folders including a message upload folder, an image upload folder, a memo upload folder and the like, respectively.

Optionally, if a user performs a direct touch or a proximity touch on an icon (e.g., a icon displayed different according to a type such as a message, an image, a memo etc.) displayed on a schedule table, whole contents are not displayed but can be partially represented as a word balloon.

<Second Embodiment>

In a mobile terminal and controlling method thereof according to a second embodiment of the present invention, if a user attempts to change a preset schedule on a schedule table displayed on a schedule management application by a unit of a predetermined period, the user is provided with schedule table of a period unit shorter than a display unit of the former schedule table to facilitate schedule management.

In the following description of the present invention, for clarity, a schedule table represented by a period unit included in a schedule table (e.g., a unit of 1 month or a unit of 4 to 5 weeks) is named a first schedule table and a schedule table represented by a period unit (e.g., a unit of a week) shorter than that of the first schedule table is named a second schedule table. In the accompanying drawings for the following description, a period included in the first schedule table is assumed as one month and a period included in the second schedule table is one week, which is just exemplary. If necessary, the present invention can be implemented in a manner that the periods corresponding to the first and second schedule tables can be modified, respectively. Moreover, the display unit 151 of the mobile terminal according to the following embodiments includes a touchscreen capable of recognizing user's contact touch and/or user's proximity touch.

Figure 14:
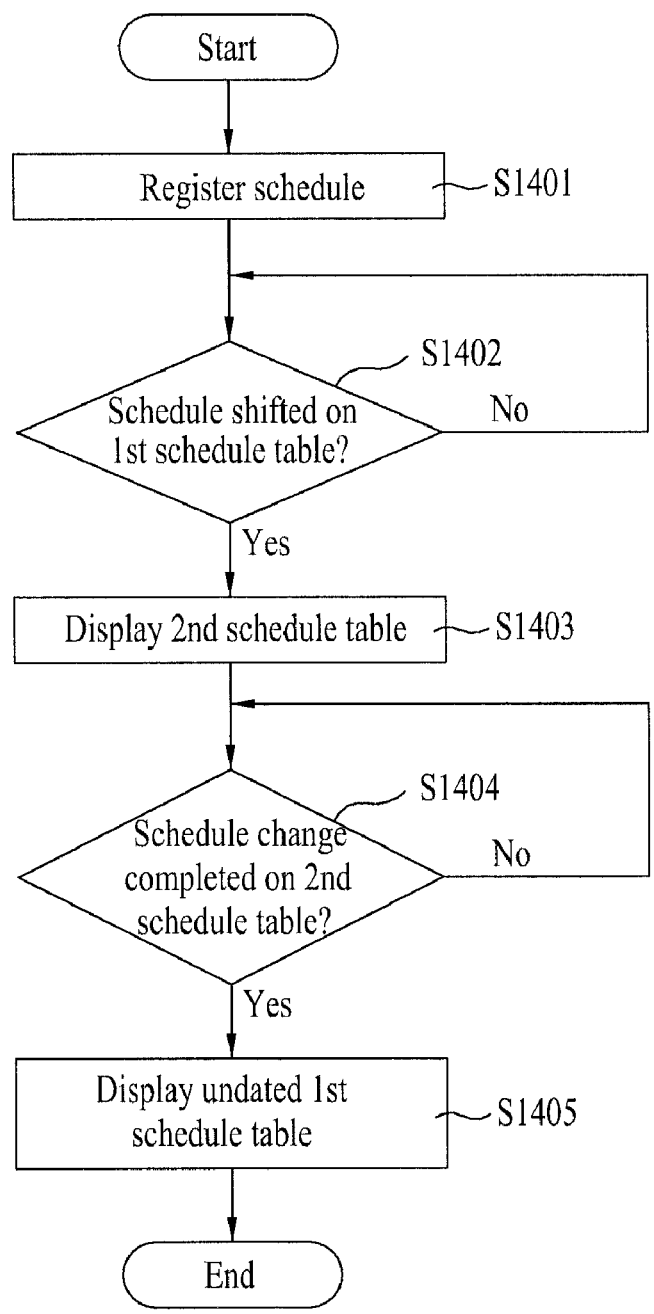
FIG. 14 is a flowchart of an example for a method of managing a schedule according to another embodiment of the present invention.

FIG. 14 is a flowchart of an example for a method of managing a schedule according to another embodiment of the present invention.

Referring to FIG. 14, at least one schedule can be registered according to a prescribed menu manipulation conducted by a user [S1401].

In this case, as mentioned in the foregoing description of one embodiment of the present invention, at least one schedule is set in association with transmitted/received/photographed time using a transmitted and/or received message (e.g., SMS, MMS, email, etc.) or a photographed photo file or can be set irrespective of the transmitted/received/photographed time. And, at least one schedule can be directly inputted by a user irrespective of a message or a photo file.

A schedule inputted by at least one of the aforesaid methods can be displayed on a first schedule table in a different fo in according to the inputting method as mentioned in the foregoing description of the first embodiment explained with reference to FIG. 10. For instance, a schedule registered via a message can be represented as an icon of a letter type and a schedule registered via a photo file can be represented as a camera or photo thumbnail. For another instance, when a schedule is set via such an event related to a phone number as a call, a message and the like, the corresponding schedule can be displayed as a photo, an avatar or its thumbnail, which is registered with a photo phonebook set by a user per number or name. Preferably, the corresponding schedule is displayed as a photo, avatar or its thumbnail, which corresponds to a recipient in case of a recipient of a transmitted message/outgoing call or an originator of a received message/incoming call, on the first schedule table. In the following description, for clarity and convenience, a prescribed figure for representing a schedule on the first or second schedule table is named a schedule icon or an icon.

In order to change an hour and date of one of the previously registered schedules, the user selects an icon corresponding to the corresponding schedule displayed on the first schedule table (in this case, assumed as displayed as an icon type) and is then able to shift the selected icon to a user-specific date [S1402].

The step S1402 can be performed in various ways, of which details shall be described later.

Subsequently, as the user shifts the icon of the corresponding schedule to the user-specific date, it is able to display a second schedule table including a week containing the user-specific date [S1403].

In particular, as the second schedule table is configured into a horizontal axis and a vertical axis, dates and/or days are represented on the horizontal axis and hours are represented on the vertical axis, and vice versa. The user arranges the icon of the corresponding schedule on the second schedule table, thereby adjusting the schedule on the second schedule table more conveniently and specifically than adjusting the schedule on the first schedule table. In doing so, the icon of the corresponding schedule displayed on the second schedule table can be modified to be suitable for the second schedule table and can be displayed together with detailed information on another schedule set within the period shown in the second schedule table. This shall be explained in detail later.

After completion of the detailed schedule change on the second schedule table by the above-described method, the first schedule table having the corresponding change item reflected thereon can be re-displayed [S1405].

Method of Shifting a Schedule on First Schedule Table

In the following description, a method of shifting a schedule on a first schedule table in the aforesaid step S1402 is explained.

Figure 15:
FIG. 15 is a diagram of one example for screen configuration of a method of moving a schedule on a first schedule table according to another embodiment of the present invention.
Figure 15:
Figure 15:
Figure 15:
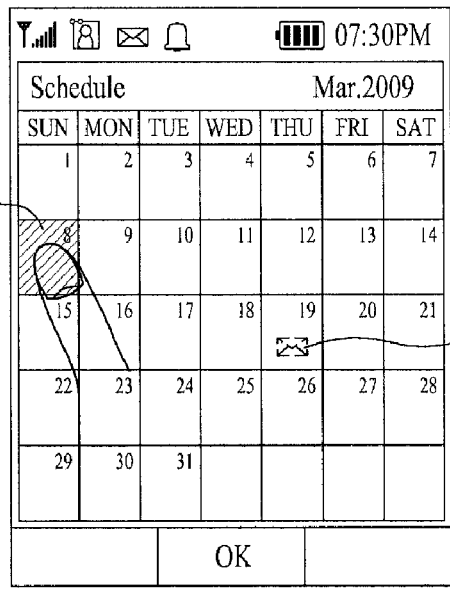

FIG. 15 is a diagram of one example for screen configuration of a method of moving a schedule on a first schedule table according to another embodiment of the present invention.

In FIG. 15, a content about an SMS message received on March 19 is registered as a schedule on the same date and is represented as an icon of a letter type on a first schedule table. And, assume that a user shifts the corresponding schedule to $8^{th}$ day.

Referring to FIG. 15 (a), a user is able to perform such an input action as a touch, a long touch, a proximity touch and a long proximity touch on a letter icon 1510 displayed on $19^{th}$ day.

Subsequently, referring to FIG. 15 (b), a menu window 1520 applicable to the corresponding icon 1510 can be displayed. In the menu window 1520, a menu 'check' for checking detailed contents of the corresponding schedule, a menu 'shift' for shifting the corresponding schedule, and a menu 'delete' for deleting the corresponding schedule are included. In this case, a type of the menu window 1520 and the menus included in the menu window 1520 are just exemplary, by which the present invention is non-limited. Alternatively, the present invention is able to display menus in various forms more or less than the exemplarily displayed menus.

Referring to FIG. 15 (c), in order to shift the corresponding icon 1510, the user selects the menu 'shift' 1525. If so, referring to FIG. 15 (d), a visual effect (e.g., semi-transparency) is applicable to the corresponding icon 1510 to indicate that the corresponding icon 1510 is being shifted. If a region 1540 corresponding to a user-specific date ($8^{th}$ day) is selected according to a touch input, the corresponding icon can be shifted to the $8^{th}$ day from the $19^{th}$ day.

For another instance of the schedule shifting method on the first schedule table, a user is able to shift a schedule through the aforesaid touch & drag input described with reference to FIG. 9 according to one embodiment of the present invention. In particular, a touch input, which is initiated from the letter icon displayed at the 15$^{th}$ day and ended at a region corresponding to the 14$^{th}$ day, i.e., a touch & drag input, can be applied to the touchscreen, on which the first schedule table is displayed. Accordingly, the letter icon can be shifted to the 14$^{th}$ day.

Meanwhile, it may happen that a date, to which the corresponding schedule shall be shifted by a user, is not displayed on the first schedule table (e.g., if a user-specific date is included in another month).

In this case, according to the method described with reference to FIG. 15, after the menu 'shift shown in FIG. 15 (*c*) has been selected, a user selects a region 1560, in which month and year are represented, changes the month and/or year, and is then able to select a specific date. Yet, according to the schedule shifting method described with reference to FIG. 9, if a touch is released to change month and/or year, a drag action ends. Therefore, the method is unable to change the month and/or year. In order to solve this problem, the present invention proposes a method of changing the month and/or year on the first schedule table conveniently without releasing the touched state. This is explained with reference to FIG. 16 as follows.

Figure 16:
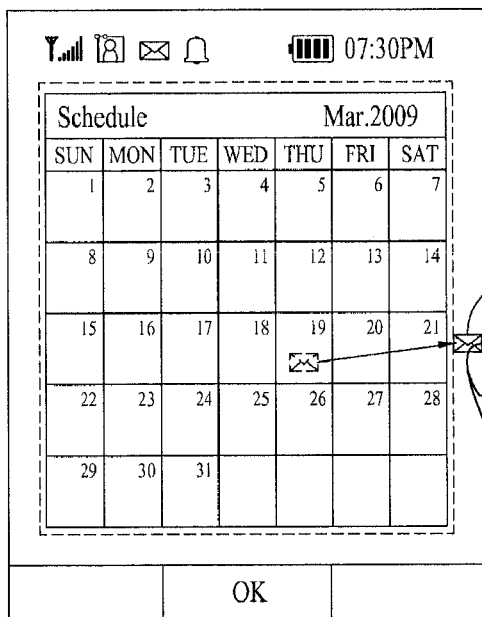
FIG. 16 is a diagram of another example for screen configuration of a method of moving a schedule on a first schedule table according to another embodiment of the present invention.
Figure 16:
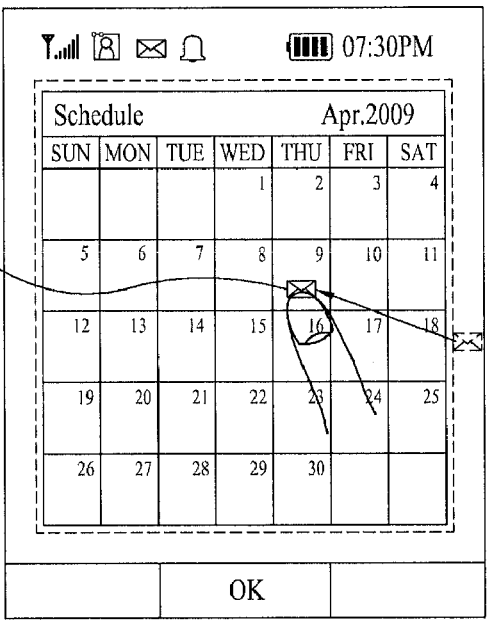
Figure 16:
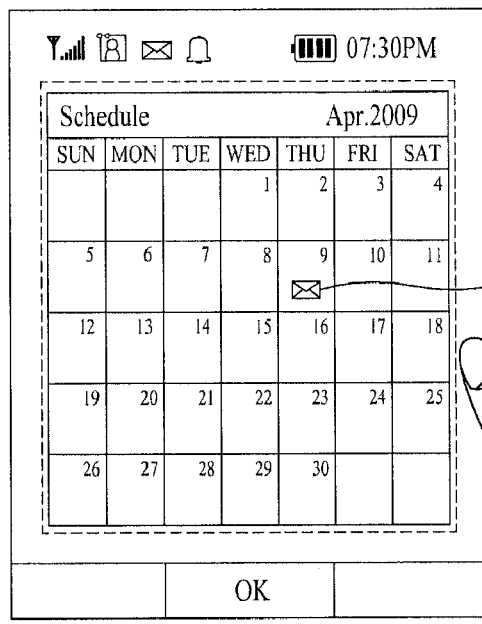

FIG. 16 is a diagram of another example for screen configuration of a method of shifting a schedule on a first schedule table according to another embodiment of the present invention.

In FIG. 16, basically, a schedule icon is shifted on a first schedule table through the touch & drag action described with reference to FIG. 9. And, assume a situation that a user attempts to shift a schedule set to March 19 to a date of April 9.

Referring to FIG. 16 (*a*), since a user-specific date 'April 9' does not exist on a first schedule table, a user has to change a divided period unit of the first schedule table, i.e., a month. For this, the user is able to shift an icon 1610 toward a right side of a first schedule table region 1630 by a touch & drag input. In doing so, the user keeps touching the first icon 1610.

Accordingly, referring to FIG. 16 (*b*), April next to March is displayed on the first schedule table. The user is then able to shift the icon 1610 to a region corresponding to April 9 for the shift of the corresponding schedule.

Afterwards, referring to FIG. 16 (*c*), the user releases the touch to the icon 1610 from the region corresponding to April 9. Thus, the user is able to conveniently perform the change of the date and month for the corresponding schedule.

In FIG. 16 (*a*), if the user drags the icon 1610 toward a left side of the first schedule table region 1630 by keeping the touch to the icon 1610, February followed by March can be displayed on the first schedule table. Meanwhile, in order to prevent malfunction, it is able to set the month displayed on the first schedule table to be changed only if a time for the icon 1610 to keep saying outside the first schedule table region 1630 exceeds prescribe duration. Optionally, it is able to set the month to be changed by month each time the prescribed duration expires.

Triggering of Second Schedule Table

In the following description, explained is the condition of a change into a second schedule table from a first schedule table according to another embodiment of the present invention. Namely, a triggering condition of a second schedule table is explained.

First of all, as mentioned in the foregoing descriptions with reference to FIG. 9, FIG. 15 and FIG. 16, a second schedule table can be automatically displayed if a shift of a schedule icon is finished on a first schedule table.

According to another condition, if a prescribed user's menu manipulation is performed on a first schedule table, a second schedule table can be displayed. This is explained with reference to FIG. 17 and FIG. 18 as follows.

Figure 17:
FIG. 17 is a diagram of one example for a method of triggering a second schedule table according to another embodiment of the present invention.
Figure 17:
Figure 17:

FIG. 17 is a diagram of one example for a method of triggering a second schedule table according to another embodiment of the present invention.

In FIG. 17, assume a case that a content about an message received on March 19 is registered with a schedule of the same day and is then displayed as an icon of a letter type on a first schedule table.

Referring to FIG. 17 (*a*), a user is able to perform such an input action as a touch, a long touch, a proximity touch and a long proximity touch on a letter icon 1710 displayed on 19$^{th}$ day.

Subsequently, referring to FIG. 17 (*b*), a menu window 1720 applicable to the corresponding icon 1710 can be displayed. In the menu window 1720, a menu 'check' for checking detailed contents of a corresponding schedule, a menu 'shift' for shifting the corresponding schedule, a menu 'second schedule table' for activating a second schedule table, and a menu 'delete' for deleting the corresponding schedule are included. In this case, a type of the menu window 1720 and the menus included in the menu window 1720 are just exemplary, by which the present invention is non-limited. Alternatively, the present invention is able to display menus in various forms more or less than the exemplarily displayed menus.

In order to activate the second schedule table, referring to FIG. 17 (*c*), a user is able to select the menu 'second schedule table' 1725. By this method, the user enables the second schedule table, in which a schedule icon located date is included, to be directly displayed without shifting the schedule icon on the first schedule table.

Meanwhile, regarding the second schedule table, in the menu structure shown in FIG. 15 (*b*), by a method of selecting the menu 'check', detailed information of a schedule corresponding to a corresponding schedule icon is triggered to be displayed on the second schedule table.

Figure 18:
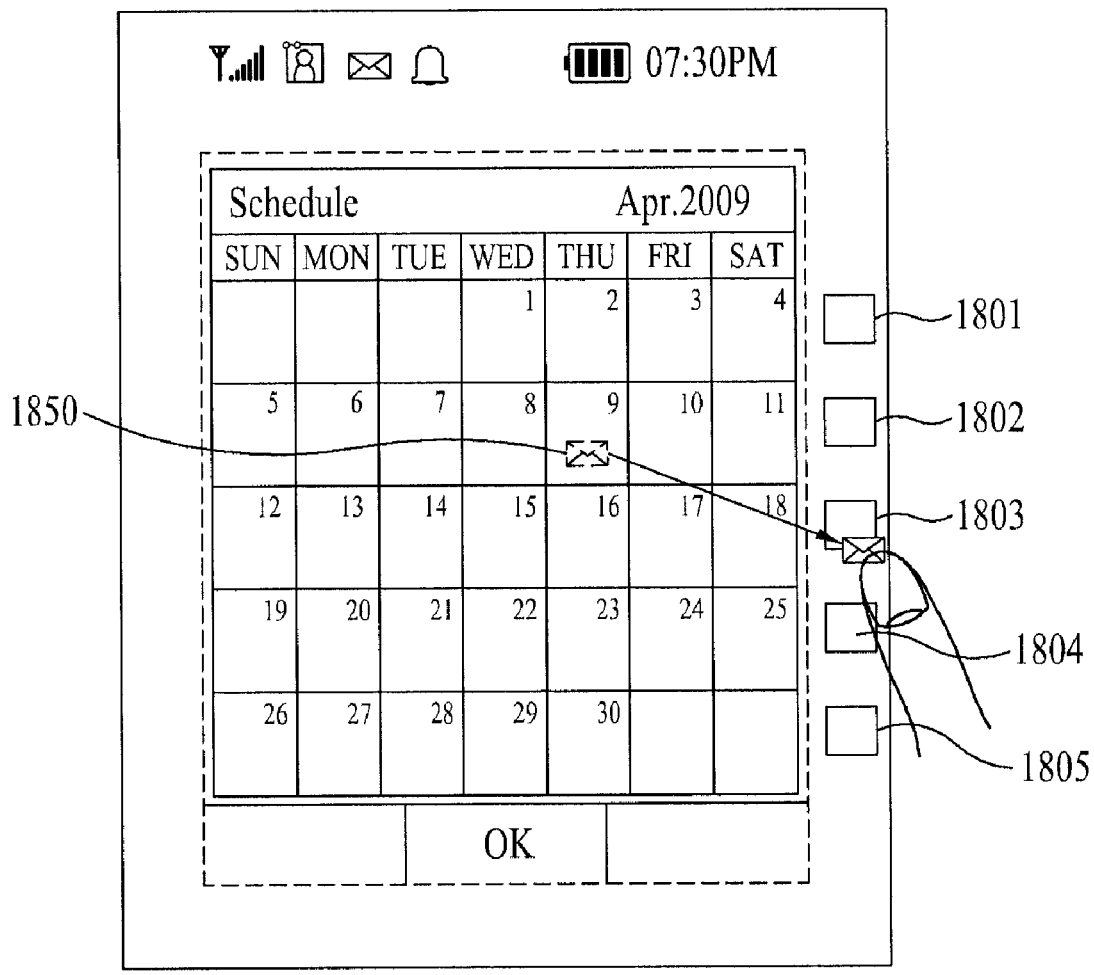
FIG. 18 is a diagram of another example for a method of triggering a second schedule table according to another embodiment of the present invention.

FIG. 18 is a diagram of another example for a method of triggering a second schedule table according to another embodiment of the present invention.

Referring to FIG. 18, buttons 1801 to 1805 for going to a second schedule table can be provided to a right side of a first schedule table by a unit of a horizontal line, i.e., by a unit of 1 week. If a user inputs a drag & drop action to the go-to button corresponding to a week including a date to which the user attempts to shift a schedule icon 1850, a second schedule table can be activated.

For instance, if a user attempts to shift a corresponding schedule to 17$^{th}$ day from 9$^{th}$ day, the user is able to activate a second schedule table including a third week by dragging & dropping the schedule icon 1850 to the go-to button 1803 corresponding to a week including the 17$^{th}$ day, i.e., the third week.

Schedule Shift on Second Schedule Table

In the following description, explained is a method of shifting or adjusting a schedule on a second schedule table according to another embodiment of the present invention. Assume that a second schedule table is displayed if at least one of the aforesaid second schedule table triggering conditions is met.

Figure 19:
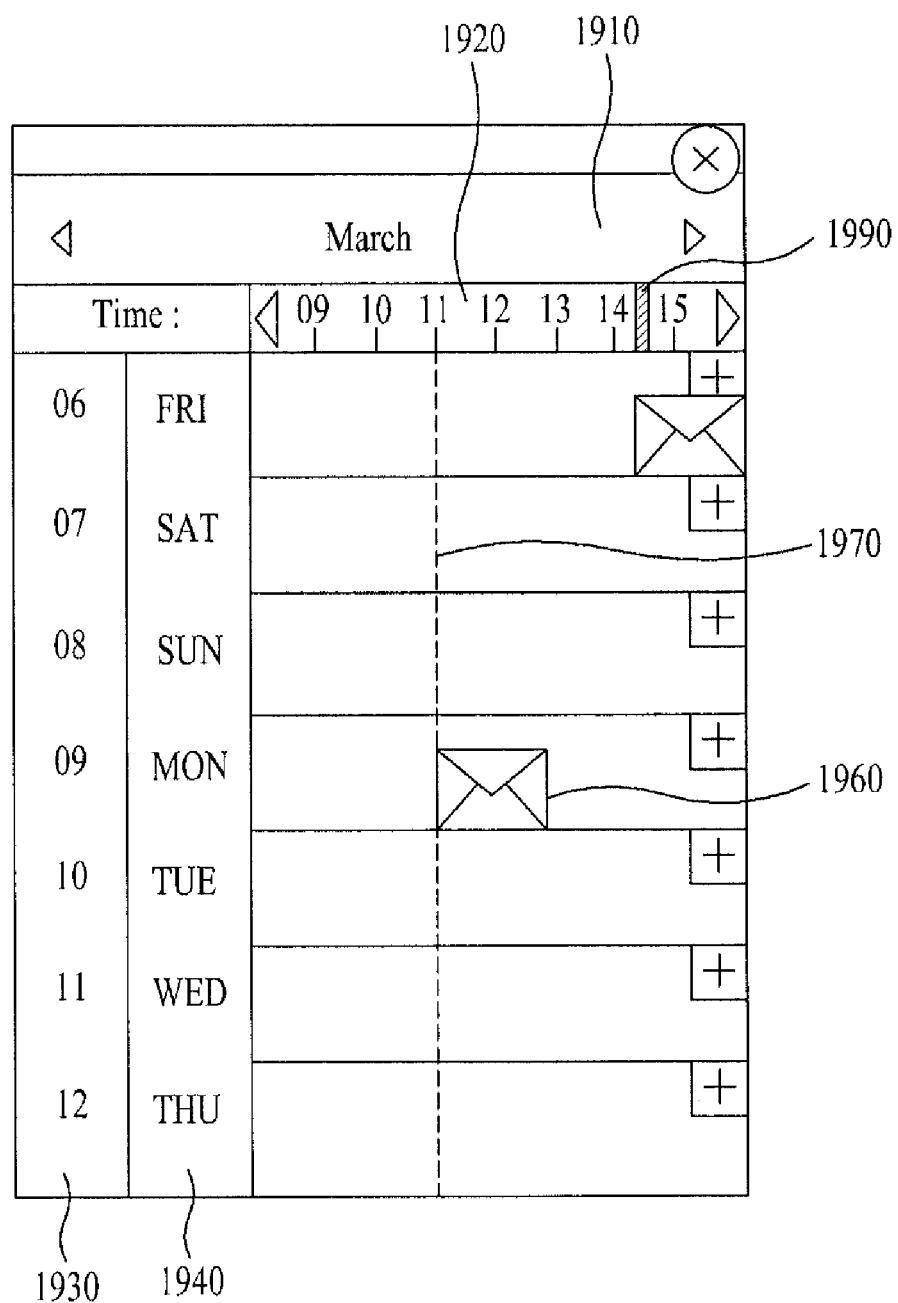
FIG. 19 is a diagram of one example for a type of a second schedule table according to another embodiment of the present invention.

FIG. 19 is a diagram of one example for a type of a second schedule table according to another embodiment of the present invention.

Referring to FIG. 19, a month 1910 (herein, March) including a second schedule table period unit is displayed on a top end of a second schedule table. Time 1920 is displayed on a horizontal axis. And, date 1930 and day of the week 1940 are displayed on a vertical axis. A user is able to change a displayed time zone by manipulating arrows at both ends of the time axis 1920. In the course of a drag input action, a time zone can be changed while the drag input is maintained on the arrow.

Instead of activating a second schedule table by specifying the week unit as mentioned in the foregoing description with reference to FIG. 18, if the second schedule table is activated by specifying a date (herein, $9^{th}$ day), a schedule icon 1960 related to a second schedule table triggering can be automatically arranged on a preset time zone of a preset date.

In particular, as mentioned in the foregoing description with reference to FIG. 17, if a second schedule table is activated without a change of schedule, the schedule icon 1960 can be arranged to correspond to the corresponding schedule setting state as it is. If a date of a schedule is changed by one of the methods described with reference to FIG. 9, FIG. 15 and FIG. 16, a schedule icon can be automatically arranged at the date on the second schedule table. Yet, in this case, the time can follow the original time of the schedule before the date is changed.

For instance, when a schedule set to A.M. 09:00 on March 13 is changed into March 9 on a first schedule table, an icon for the corresponding schedule can be automatically arranged at 11 hour, on March 9 on a second schedule table, as shown in FIG. 19. In this case, in order to facilitate a user to recognize a timing point of the corresponding schedule more accurately, a doted line 1970 configured to connect the time axis 1920 and one edge of the schedule icon to each other can be additionally displayed. In particular, the doted line can be changed into a line of a different type. In order to replace the line, time can be displayed in an information window, a thumbnail, a word balloon or the like around the icon. Moreover, although a left edge of the icon is represented as a setting time of the corresponding schedule in FIG. 19, it can be variously changed into a middle position, a right side, a random position or the like if necessary.

Instead of specifying the date as mentioned in the foregoing description with reference to FIG. 18, if a period included in the second schedule table is specified only, the schedule icon can be previously arranged randomly or according to a preset rule.

Meanwhile, if a different schedule exists in the period of the former schedule on the second schedule table, an icon 1980 corresponding to the different schedule can be displayed in addition. Moreover, a current time can be additionally represented as a prescribed visual effect 1990 on the horizontal axis 1920 representing the time.

Figure 20:
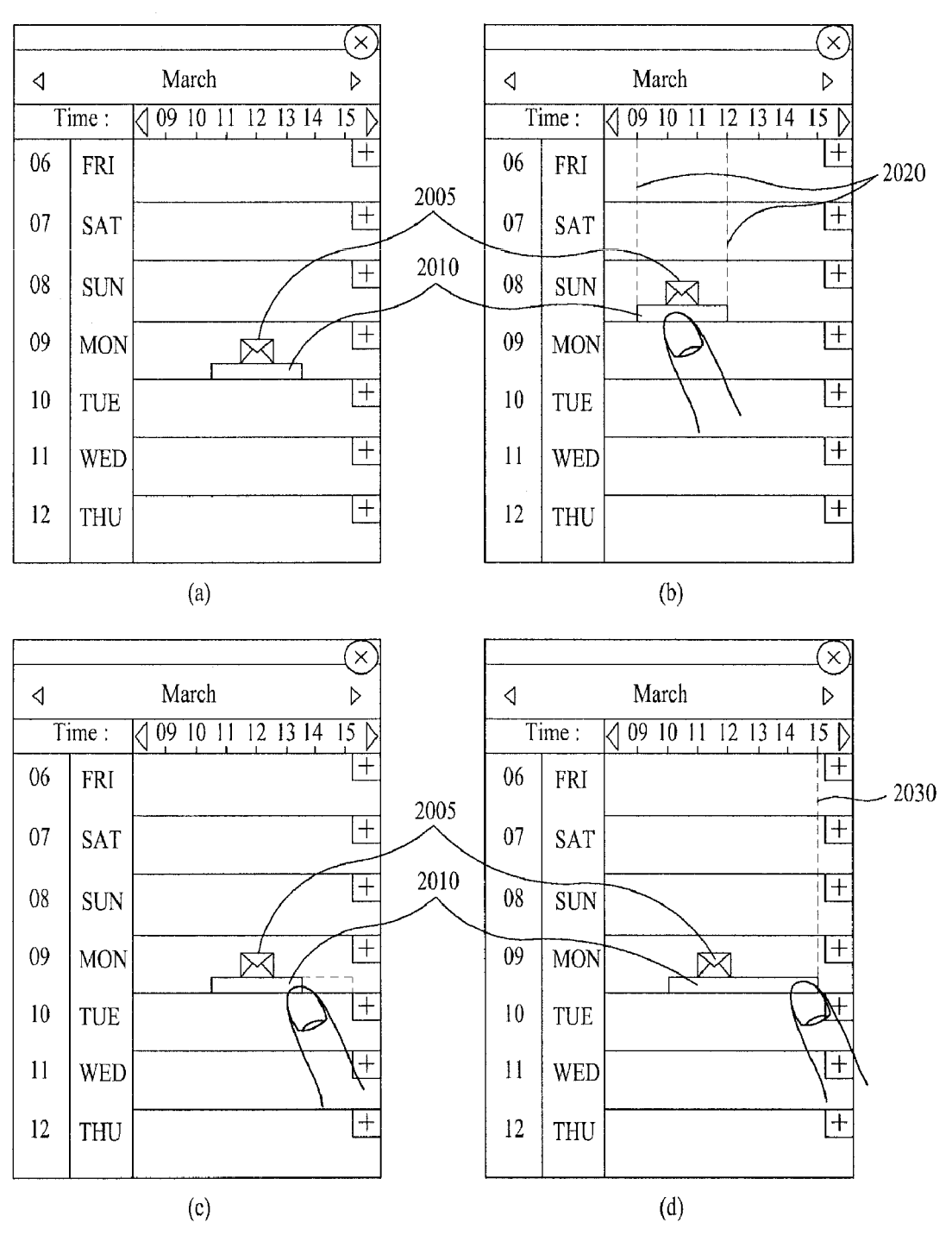

In the following description, explained with reference to FIG. 20 is a method of changing a schedule, which is set by a section due to the coexistence of a start point and an end point instead of a specific hour, on a second schedule table.

FIG. 20 is a diagram of one example for a method of changing a schedule section on a second schedule table according to another embodiment of the present invention.

As mentioned in the foregoing description, a schedule set to a specific hour is arranged on a second schedule table in a manner that a specific portion (or an extended line) of a schedule icon crosses over one point of a time axis corresponding to the specific hour. Yet, in FIG. 20, in order to display a schedule set to both a start point and an end point instead of a specific hour, it is able to use a bar corresponding to a length between the start and end points of the corresponding schedule. Moreover, it is able to further use an icon provided next to the bar to indicate a prescribed cause or path of the corresponding schedule.

Referring to FIG. 20 (*a*), a bar 2010 indicating a schedule, which has 3-hour length starting from 10 hour on March 9 and ending at 13 hour of the same day, is displayed. And, a letter type icon 2005 can be displayed on the bar 2010 to indicate that the corresponding schedule is set via a message.

In case that a user attempts to change a date and time by leaving the length (3 hours) of the corresponding schedule as it is, referring to FIG. 20 (*b*), it is able to change the hour and date of the schedule with the same length of the bar by touching and dragging a middle point of the bar 2010 or the schedule icon 2005. In doing so, extended lines 2020 on a time axis are additionally displayed along both end portions (i.e., start and end points) of the bar 2010, whereby a user is facilitated to change the hour and date.

If a user attempts to delay an end point by 2 hours 2015 while a start time of a corresponding schedule is maintained intact [FIG. 20 (*c*)], a length of the bar 2010 can be changed in a manner of applying a touch & drag input to a right edge indicating the end point in the length bar 2010 [FIG. 20 (*d*)]. In doing so, an extended line 2030 on a time axis can be additionally displayed along the right edge of the bar 2010, whereby a user is facilitated to recognize the time extended through the touch & drag input.

On the contrary, if a user attempts to advance an end point, it is able to apply a touch & drag input to a right edge of the length bar in a left direction in a manner similar to that shown in FIG. 20 (*d*). If a user attempts to change a start point, it is able to apply a touch & drag input to a left edge of the length bar. In this case, in order to discriminate a bar touched point of a case of adjusting a middle point of the length bar [FIG. 20 (*b*)] from a bar touched point of a case of adjusting an edge of the length bar [FIG. 20 (*d*)], it is able to discriminate regions of the middle point and the edge from each other by diving a prescribed visual effect to the length bar.

Figure 21:
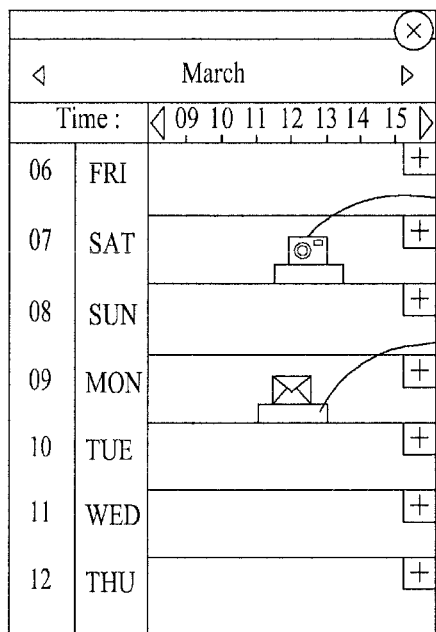
FIG. 21 is a diagram of one example for an operation when a method of changing a schedule section on a second schedule table according to another embodiment of the present invention collides with another schedule.
Figure 21:
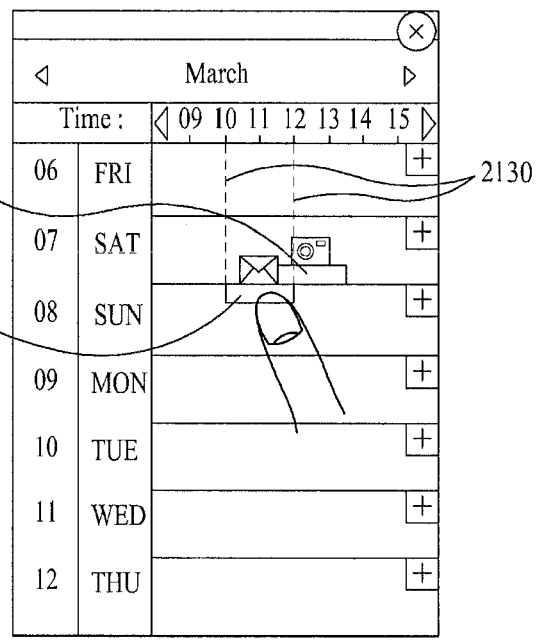
Figure 21:
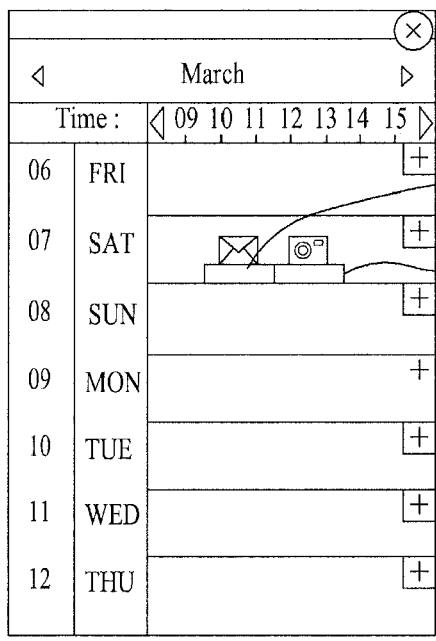
Figure 21:
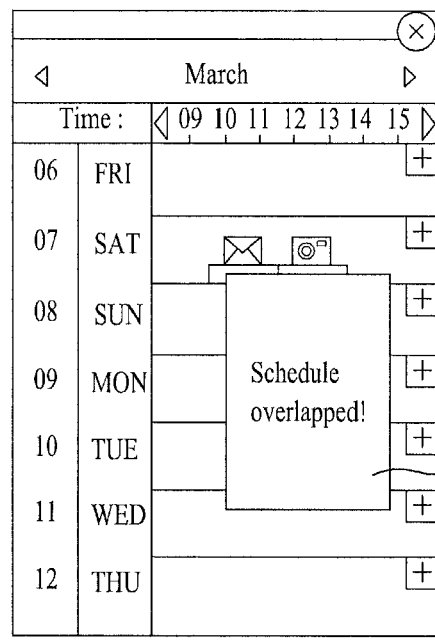

In the following description, explained with reference to FIG. 21 is a case that a length bar or schedule icon, which is dragged in changing a schedule by the schedule changing method described with reference to FIG. 20 (*b*), is overlapped with that of a preset different schedule.

FIG. 21 is a diagram of one example for an operation when a method of changing a schedule section on a second schedule table according to another embodiment of the present invention collides with another schedule.

Referring to FIG. 21 (*a*), a length bar and icon 2110 indicating a schedule set between 10 and 12 hours on March 9 via a message and a length bar and icon 2120 indicating a schedule set between 11 and 13 hours on March 7 via a photographed photo are displayed on a second schedule table. In this case, a user attempts to shift the schedule set on March 9 to a similar time zone on March 7.

Referring to FIG. 21 (*b*), the user is able to bring the bar and icon 2110 to a region corresponding to March 7 by applying a touch & drag input to a middle point of the length bar 2210 of the corresponding schedule. In doing so, in order to help the user changing the schedule, extended lines 2130 configured to connect both end portions of the length bar and the time axis, respectively can be additionally displayed. In this case, it may happen that the length bar 2110 of the corresponding schedule 2110 is overlapped with the length bar 2120 preset on March 7 in part at least.

If so, the length bar 2110 of the corresponding schedule, as shown in FIG. 21 (*c*), can be automatically relocated at a closest time zone avoiding being overlapped with the preset length bar 2120, i.e., at the position between 9 and 11 hours.

Moreover, in this case, a guide message 2150, as shown in FIG. 21 (*d*), can be displayed in addition.

Yet, whether to use the auto relocating function described with reference to FIG. 21 can be determined via user's prescribed menu manipulation. If time zones, on which a plurality of schedules are set, are allowed to be overlapped with each other, the auto relocation function can be automatically released.

Schedule Change History Information

In the following description, explained are methods of showing schedule change history, which indicates a history of schedule changed by one of the above described methods, to a user.

First of all, a method of displaying a schedule change history is described with reference to FIG. 22. Secondly, a type of displaying a schedule change history is described with reference to FIG. 23.

Figure 22:
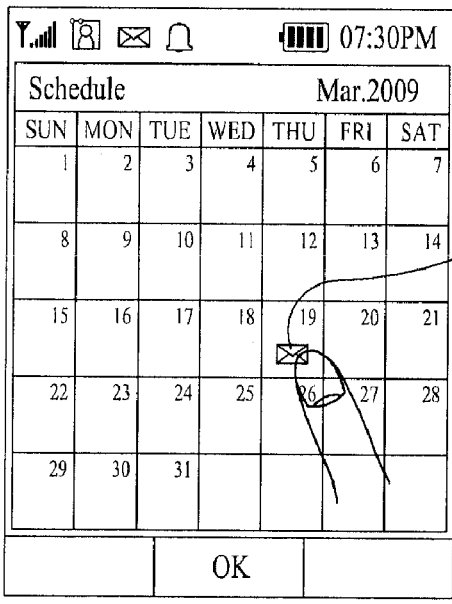
FIG. 22 is a diagram of examples for a manipulating method of displaying a schedule changed history according to another embodiment of the present invention.
Figure 22:
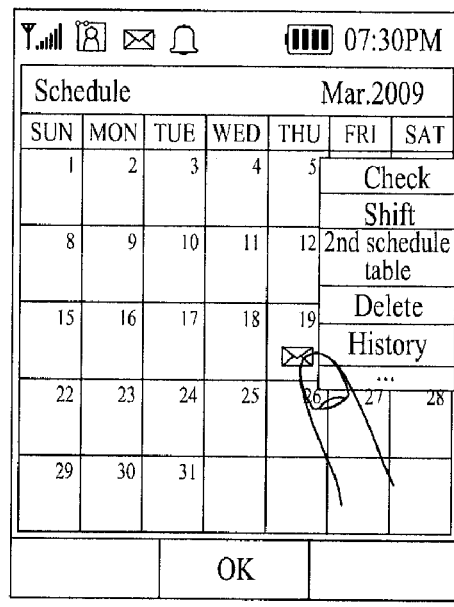
Figure 22:

FIG. 22 is a diagram of examples for a manipulating method of displaying a schedule changed history according to another embodiment of the present invention.

Referring to FIG. 22 (a), a user is able to perform such an input action as a touch, a long touch, a proximity touch and a long proximity touch on a letter icon 2210 displayed on $19^{th}$ day.

Subsequently, referring to FIG. 22 (b), a menu window 2220 applicable to the corresponding icon 2210 can be displayed. In the menu window 2220, a menu 'check' for checking detailed contents corresponding schedule, a menu 'shift' for shifting the corresponding schedule, a menu 'second schedule table' for activating a second schedule table, a menu 'delete' for deleting the corresponding schedule, and a menu 'history' for displaying a schedule change history are included. In this case, a type of the menu window 2220 and the menus included in the menu window 2220 are just exemplary, by which the present invention is non-limited. Alternatively, the present invention is able to display menus in various forms more or less than the exemplarily displayed menus.

Subsequently, the user is able to select the menu 'history' 2230, as shown in FIG. 22 (c), to view the schedule change history.

Alternatively, as a touch input of a prescribed type is applied to the schedule icon 2210 shown in FIG. 22 (a), a schedule change history of a prescribed type can be directly displayed on a first schedule table. Yet, in case of displaying the schedule change history in this manner, it is preferable that the touch input is not overlapped with the former touch input for paging the menu window shown in FIG. 15, FIG. 17 or FIG. 22.

Figure 23:
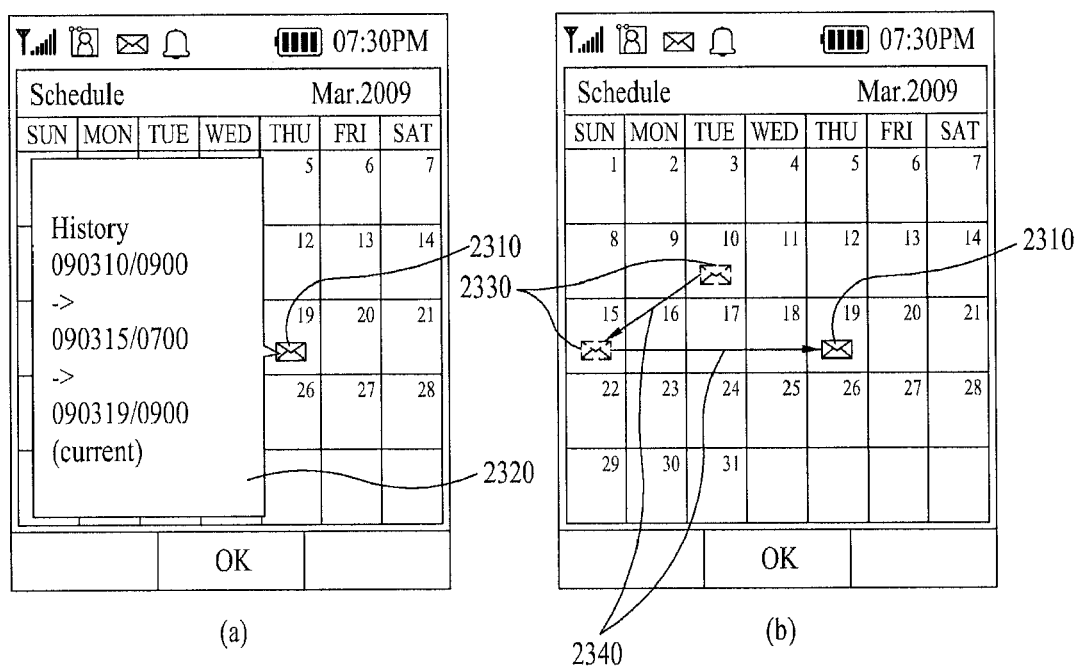
FIG. 23 is a diagram for types of displaying a schedule changed history on a first schedule table according to another embodiment of the present invention.

FIG. 23 is a diagram for types of displaying a schedule changed history on a first schedule table according to another embodiment of the present invention.

Referring to FIG. 23 (a), a schedule change history of a specific schedule can be displayed as a popup window 2320 in the vicinity of a corresponding icon 2310. In this case, the popup window 2320 is displayed semitransparent, is displayed at a position irrespective of the corresponding schedule icon 2310, or can be always displayed at a predetermined position. Alternatively, the schedule change history can be represented as a whole picture.

Referring to FIG. 23 (b), a schedule change history of a specific schedule can be displayed as arrows arranged in order of change on a first schedule table. In particular, an icon 2310 for a specific schedule and an icon 2330 having a prescribed visual effect (herein, semitransparent) given thereto are arranged on the first schedule table and arrows 2340 connecting the arranged icons to each other in order of change can be displayed. Each of the arrows is replaced by one of a trace, a doted line, a solid line and the like or can be displayed in various forms.

Meanwhile, according to another embodiment of the present invention, in case that a date of a schedule icon is changed on a first schedule table, a function of displaying a second schedule table automatically can be turned on/off by a prescribed menu manipulation. And, a user is able to exchange contents displayed on horizontal and vertical axes of the second schedule table with each other through a prescribed menu manipulation. Moreover, the second schedule table is usable in case that a user initially sets a schedule as well as changes a schedule.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

The above-described mobile communication terminal and schedule managing method using the same are not limitedly applicable to configurations and methods of the described embodiments. The embodiments are selectively combined entirely or in part to enable various modifications thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing a schedule using a mobile terminal, the method comprising:
   displaying, on a touch screen, a first schedule table set by a first period unit by including at least one schedule, wherein each of the at least one schedule is represented as an icon of a prescribed type;
   changing a position of a specific schedule from among the at least one schedule on the first schedule table according to a user's first touch input via the touch screen;
   displaying a second schedule table set by a second period unit shorter than the first period unit by including a point corresponding to the changed position; and
   changing at least one of a position and a period of the specific schedule according to a user's second touch input via the touch screen, wherein the changing includes:
   recognizing one selected from the group consisting of a touch, a long touch and a long proximity touch to a first icon corresponding to the specific schedule,
   displaying a menu window that includes a shift menu for shifting the first icon and a history menu, and
   displaying change history information that indicates a change history of the specific schedule on the first schedule table, when the history menu is selected by a touch input from the menu window,
   wherein displaying change history information includes displaying a first icon corresponding to a current time point of the specific schedule and at least one second icon corresponding to each of at least one previous time point of the specific schedule on the first schedule table, and wherein each of the first icon and the at least one second icon are connected with a line in order of change.

2. The method of claim 1, wherein the icon has a different type according to a path for setting the schedule.

3. The method of claim 1, wherein when the schedule includes a start point and an end point, the icon includes a length bar corresponding to a schedule length determined by the start point and the end point.

4. The method of claim 1, wherein the first touch input comprises a touch & drag input starting from a point corresponding to the first icon and released from the changed position.

5. The method of claim 1, wherein the second schedule table includes a horizontal axis and a vertical axis, wherein a time is displayed on either the horizontal axis or the vertical axis, and wherein the second period unit is displayed on either the vertical axis or the horizontal axis.

6. The method of claim 1, wherein the line comprises an arrow, a trace, a dotted line or a solid line.

7. The method of claim 1, wherein a prescribed visual effect is applied to the at least one second icon.

8. A mobile terminal comprising:
a touchscreen configured to recognize a touch input of a user; and
a controller configured to:
  display a first schedule table set by a first period unit, the first schedule table configured to include at least one schedule, wherein each of the at least one schedule is represented as an icon of a prescribed type;
  display a second schedule table set by a second period unit shorter than the first period unit by including a point corresponding to the changed position, when a position of a specific schedule from among the at least one schedule information is changed on the first schedule table according to a user's first input via the touchscreen,
  control at least one of a position and a period of the specific schedule to be changed according to a user's second input via the touchscreen,
  recognize one selected from the group consisting of a touch, a long touch and a long proximity touch to a first icon corresponding to the specific schedule,
  display a menu window that includes a shift menu for shifting the first icon and a history menu, and
  display change history information that indicates a change history of the specific schedule by displaying a first icon corresponding to a current time point of the specific schedule and at least one second icon corresponding to each of at least one previous time point of the specific schedule on the first schedule table, when the history menu is selected from the menu window via the touchscreen, and wherein each of the first icon and the at least one second icon being connected with a line in order of change.

9. The mobile terminal of claim 8, wherein the line comprises an arrow, a trace, a dotted line or a solid line.

10. The mobile terminal of claim 8, wherein a prescribed visual effect is applied to the at least one second icon.

* * * * *